(12) United States Patent
Shinagawa et al.

(10) Patent No.: US 7,822,530 B2
(45) Date of Patent: Oct. 26, 2010

(54) GAS-FUELED INTERNAL COMBUSTION ENGINE AND CONTROL METHOD FOR GAS-FUELED INTERNAL COMBUSTION ENGINE

(75) Inventors: Tomohiro Shinagawa, Sunto-gun (JP); Makoto Suzuki, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 247 days.

(21) Appl. No.: 12/162,399

(22) PCT Filed: Dec. 28, 2006

(86) PCT No.: PCT/IB2006/003780
§ 371 (c)(1),
(2), (4) Date: Jul. 28, 2008

(87) PCT Pub. No.: WO2007/085897

PCT Pub. Date: Aug. 2, 2007

(65) Prior Publication Data
US 2009/0012698 A1   Jan. 8, 2009

(30) Foreign Application Priority Data
Jan. 27, 2006   (JP)   ............................. 2006-018510

(51) Int. Cl.
*F02D 19/02*   (2006.01)
(52) U.S. Cl. ...................................................... 701/103
(58) Field of Classification Search ................. 701/102, 701/103, 104
See application file for complete search history.

(56) References Cited

U.S. PATENT DOCUMENTS 6,202,601 B1 *   3/2001   Ouellette et al. ............ 123/299

(Continued)

FOREIGN PATENT DOCUMENTS

JP            6 88542         3/1994

(Continued)

OTHER PUBLICATIONS

Korean Office Action with an English translation, dated Aug. 5, 2010, issued to the corresponding Korean Patent Application KR 10-2008-7018316.

*Primary Examiner*—Stephen K Cronin
*Assistant Examiner*—Arnold Castro
(74) *Attorney, Agent, or Firm*—Oblon, Spivak, McClelland, Maier & Neustadt, L.L.P.

(57) ABSTRACT

In a gas-fueled internal combustion engine, an ignition device (16, 60, 62, 64, 66) is arranged in a moving direction of a stream of the gaseous fuel injected from an in-cylinder injection valve (40) in a combustion chamber. The ignition device can directly ignite the fuel stream and diffusive combustion of the gaseous fuel can be executed by sequentially injecting the gaseous fuel toward a flame created by the ignition. Further, premix combustion of the gaseous fuel can also be performed by igniting an air-fuel mixture after the gaseous fuel injected from the in-cylinder injection valve has been sufficiently mixed with the air. As an operation mode of the engine, a lean premix combustion operation is selected when the engine is operated in a prescribed operation region, and the operation mode is changed to a diffusive combustion operation when the engine is operated in a higher load operation region than the prescribed operation region.

20 Claims, 27 Drawing Sheets

U.S. PATENT DOCUMENTS

| | | | |
|---|---|---|---|
| 7,117,830 B1 * | 10/2006 | Boyer et al. | 123/295 |
| 7,188,607 B2 * | 3/2007 | Kobayashi | 123/299 |
| 7,219,634 B2 * | 5/2007 | Hitomi et al. | 123/299 |
| 2002/0078918 A1 | 6/2002 | Ancimer et al. | |
| 2005/0155344 A1 | 7/2005 | Kobayashi | |
| 2009/0043479 A1 * | 2/2009 | Noda et al. | 701/103 |

FOREIGN PATENT DOCUMENTS

| | | |
|---|---|---|
| JP | 7-133731 | 5/1995 |
| JP | 2004-44417 | 2/2004 |
| JP | 2004 76679 | 3/2004 |
| JP | 2005-315211 | 11/2005 |
| JP | 2005-325811 | 11/2005 |
| WO | 03 087561 | 10/2003 |

* cited by examiner

F I G . 12
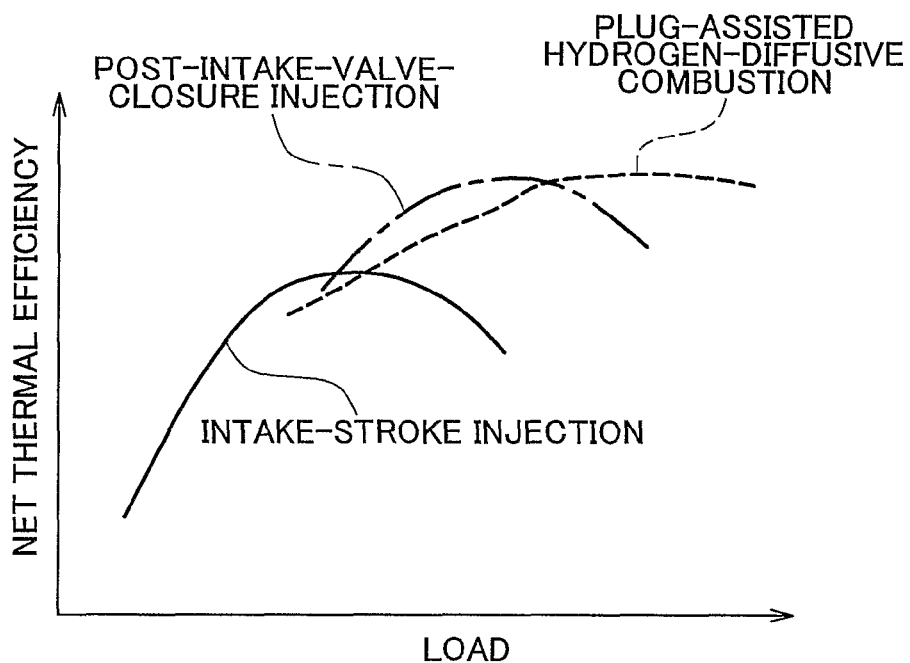
F I G . 13
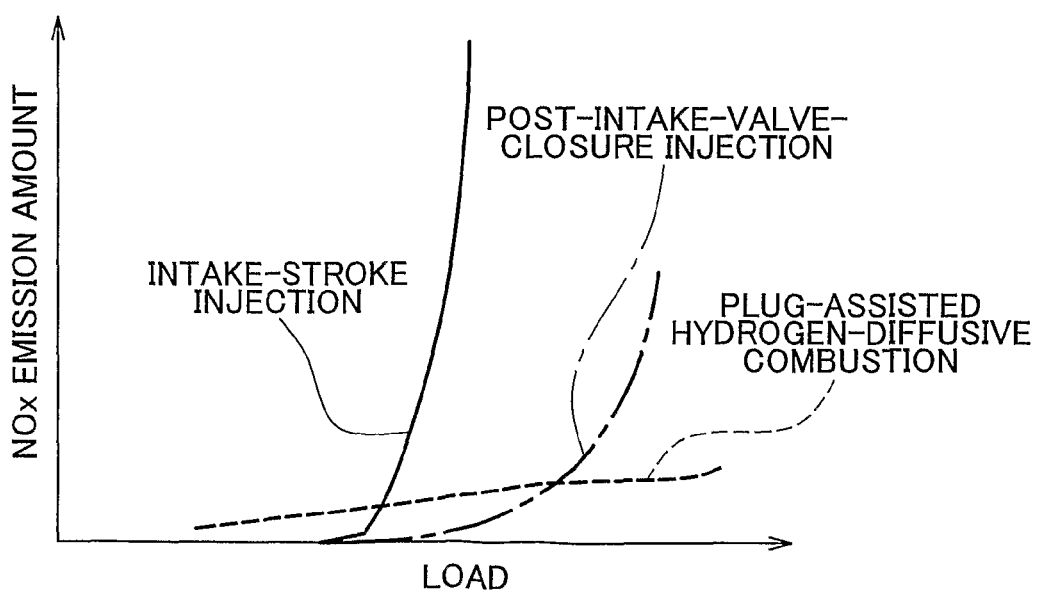

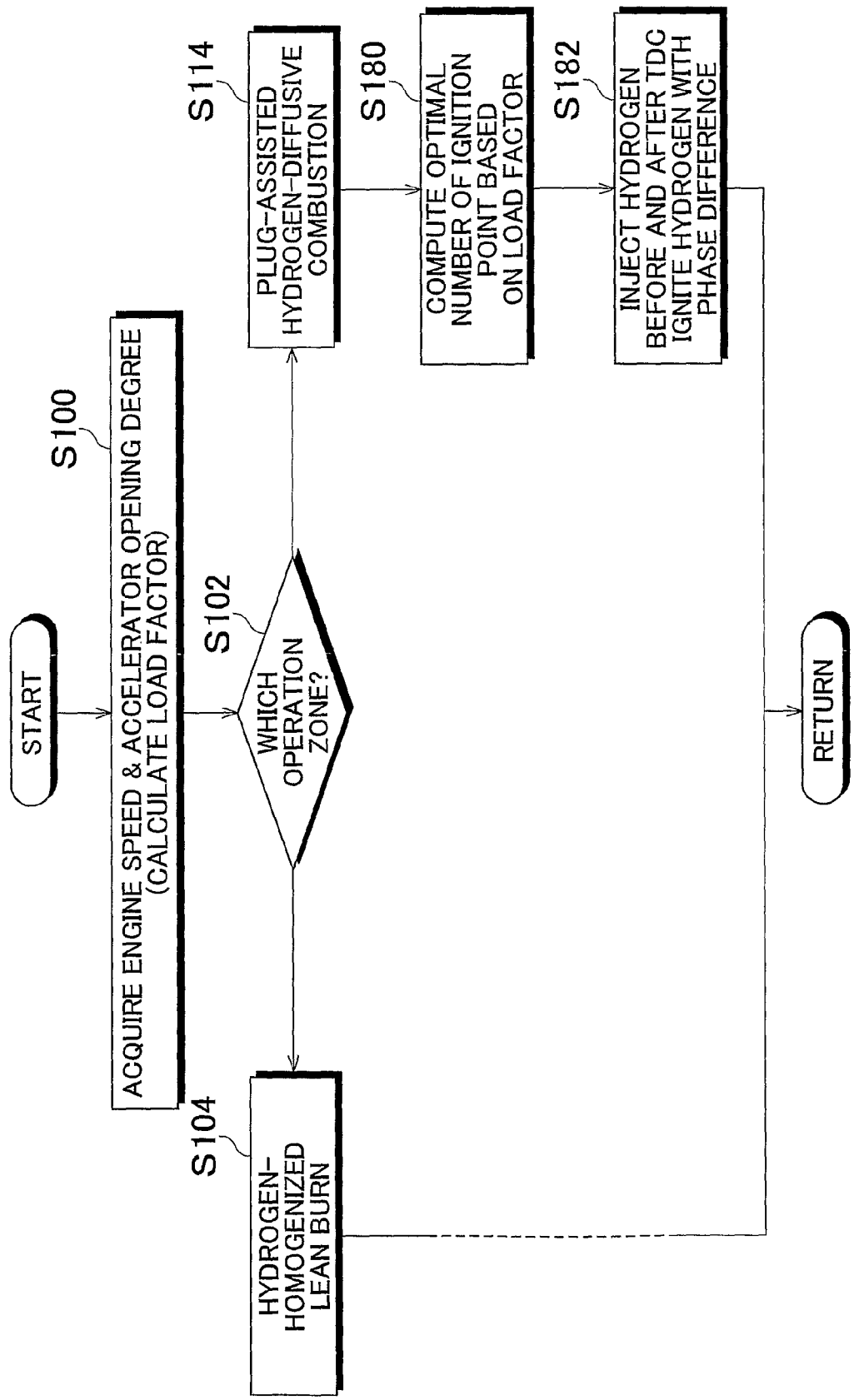

GAS-FUELED INTERNAL COMBUSTION ENGINE AND CONTROL METHOD FOR GAS-FUELED INTERNAL COMBUSTION ENGINE

BACKGROUND OF THE INVENTION

1. Field of the Invention

The present invention relates to a gas-fueled internal combustion engine operable with gaseous fuel such as hydrogen or the like.

2. Background of the Invention

As described in Japanese Patent Application Publication No. JP-A-6-88542 for example, hydrogen, a gaseous fuel, may be used as a fuel for an internal combustion engine. Hydrogen has a combustibility range as broad as 4-75 percent by volume and can be readily burned in an extremely lean air-fuel mixture having an air excess ratio $\lambda$ that is equal to or greater than about 4. Thus, if hydrogen is used as a fuel for an internal combustion engine, power can be extracted even at an extremely lean air-fuel ratio, thereby making it possible to realize what is called a "super lean burn operation".

In a super lean burn operation, it is possible to open a throttle valve fully, thereby reducing pumping loss and decreasing combustion temperature, which in turn leads to a reduction in a cooling loss. Such reduction in the pumping loss and the cooling loss improves engine efficiency so that the engine can be operated with an excellent fuel economy and high efficiency. Furthermore, the reduction in the combustion temperature helps to suppress $NO_x$ emission and the use of hydrogen fuel can also prevent any production of $CO_2$ and CO. This means that the hydrogen-fueled super-lean burn operation can realize a completely zero emission.

However, it is difficult to realize the hydrogen-fueled super lean burn operation in a high load region since while the quantity of hydrogen fuel has to be increased in the high load region in order to generate a required output power to realize the operation, there is a limit on the quantity of intake air that can be charged for that purpose. For this reason, as compared with the amount of hydrogen, that of the intake air runs short in the high load region, thereby making it impossible to maintain a super lean burn air-fuel ratio needed.

An air-fuel ratio heavily influences the efficiency and emission control in an internal combustion engine. FIG. 32 illustrates the influence of an air excess ratio $\lambda$ on the thermal efficiency and the cooling loss of an internal combustion engine wherein the X-axis represents the air excess ratio $\lambda$ and the Y-axis refers to the thermal efficiency and the cooling loss. As illustrated in this graph, the cooling loss increases as the air excess ratio $\lambda$ decreases. In particular, the cooling loss increases sharply if the air excess ratio $\lambda$ becomes smaller than 2. As a consequence, the thermal efficiency of an internal combustion engine reaches a peak point when the air excess ratio $\lambda$ is around 2, and then gradually decreases as the air excess ratio $\lambda$ decreases in the area where $\lambda$ is smaller than 2.

FIG. 33 represents graphs corresponding to the variation of the $NO_x$ emission amount with respect to the air excess ratio $\lambda$ in cases where hydrogen and gasoline are used as fuel, respectively, wherein the X-axis denotes the air excess ratio $\lambda$ and the Y-axis refers to the $NO_x$ emission amount. As can be seen in these graphs, in the case where hydrogen is used as fuel, the $NO_x$ emission amount is nearly zero when the air excess ratio $\lambda$ is greater than 2. However, when the air excess ratio $\lambda$ is smaller than 2, the $NO_x$ emission amount in the case of hydrogen being used as the fuel drastically increases to where it is greater than the $NO_x$ emission amount in a case where gasoline is used as the fuel.

As noted above, the hydrogen-fueled internal combustion engine ("hydrogen internal combustion engine") is essentially able to operate with high efficiency and low emission as long as the air excess ratio $\lambda$ is kept greater than 2, but suffers from reduced efficiency and a sharp increase in the $NO_x$ emission amount when the air excess ratio $\lambda$ is smaller than 2. This is because the combustion rate of hydrogen is several times higher than (a little less than ten times) that of a hydrocarbon fuel such as gasoline or the like and further because the combustion proceeds even more rapidly as the air-fuel ratio comes closer to a stoichiometric air-fuel ratio (namely, $\lambda=1$). FIG. 34 depicts graphs corresponding to the variation of a heat generation rate with respect to a crank angle at $\lambda=1$ and $\lambda=2$, respectively, wherein the X-axis denotes the crank angle and the Y-axis refers to the heat generation rate. As shown in these graphs, the heat generation rate is gently increased and has a lower peak at $\lambda=2$. On the other hand, at $\lambda=1$, the heat generation rate undergoes a sharp increase and has a higher peak. The combustion of an air-fuel mixture in a combustion chamber occurs rapidly and furiously as the peak of the heat generation rate becomes higher.

Such rapid combustion leads to an increased combustion temperature within the combustion chamber. Consequently, the cooling loss increases and the $NO_x$ emission amount soars drastically as set forth above. Moreover, in practice, the pressure-increase rate within a cylinder becomes significantly high, so that a flame noise and an engine body damage noticeably increase. These factors make it difficult for conventional hydrogen internal combustion engine to operate under sustained high loads.

SUMMARY OF THE INVENTION

The present invention provides a gas-fueled internal combustion engine that operates with high efficiency and low emissions over a broad operation range extending from a low load region to a high load region, and a control method therefor.

In accordance with a first aspect of the present invention, there is provided a gas-fueled internal combustion engine operable with a gaseous fuel, including: an in-cylinder injection valve that injects the gaseous fuel directly into the combustion chamber; an ignition device arranged in a direction of a stream of the gaseous fuel injected from the in-cylinder injection valve; and a control unit for controlling operation timing of the ignition device and operation timing of the in-cylinder injection valve to change between a lean premix combustion operation mode or diffusive combustion operation mode in accordance with the gaseous fuel injected from the in-cylinder injection valve. The control unit selects the lean premix combustion operation mode for premixing and combusting the gaseous fuel at a lean air-fuel ratio when the internal combustion engine is operated in a prescribed operation region, and selects the diffusive combustion operation mode for diffusion-combusting the gaseous fuel when the internal combustion engine is operated in a higher load operation region than the prescribed operation region.

In accordance with a second aspect of the present invention, the internal combustion engine is a hydrogen internal combustion engine that uses hydrogen gas as the gaseous fuel.

In accordance with a third aspect of the present invention, the control unit selects the lean premix combustion operation mode in an operation region where an air excess ratio can be kept substantially equal to or greater than 2 and selects the diffusive combustion operation mode in an operation region where the air excess ratio cannot be kept substantially equal to or greater than 2.

In accordance with a fourth aspect of the present invention, the gas-fueled internal combustion engine further includes a unit for determining an air excess ratio, and the control unit changes the operation mode of the internal combustion engine to the diffusive combustion operation mode when the air excess ratio is below a predetermined threshold value during the lean premix combustion operation.

In accordance with a fifth aspect of the present invention, the gas-fueled internal combustion engine further includes a means for acquiring the in-cylinder pressure-increase rate, and the control unit changes the operation mode of the internal combustion engine to the diffusive combustion operation mode, when the in-cylinder pressure-increase rate is above a predetermined threshold value during the lean premix combustion operation.

In accordance with a sixth aspect of the present invention, when executing the diffusive combustion operation, the control unit pilot-injects a fraction of the gaseous fuel of a quantity that is decided based on the required load and performs a main injection for diffusive combustion in an atmosphere under which the pilot injection of gaseous fuel is mixed with air.

In accordance with a seventh aspect of the present invention, the control unit activates the ignition device after the pilot injection, but before the main injection.

In accordance with an eighth aspect of the present invention, when executing the diffusive combustion operation, the control unit additionally activates the ignition device in the course of the injection of gaseous fuel depending on the gaseous fuel injection period.

In accordance with a ninth aspect of the present invention, a plurality of ignition devices may be arranged along the path of the injected gaseous fuel and, during the time of executing the diffusive combustion operation, the control unit activates the plurality of ignition devices either simultaneously or sequentially with a phase difference according to the distance, from closest to farthest, with respect to the in-cylinder injection valve.

In accordance with a tenth aspect of the present invention, the in-cylinder injection valve may be configured to inject the gaseous fuel in a plurality of directions and a plurality of ignition devices may be arranged in alignment with the respective injection paths of the in-cylinder injection valve.

In accordance with an eleventh aspect of the present invention, the control unit allows the in-cylinder injection valve to inject the gaseous fuel prior to closure of an intake valve in a low load region of the operation region, where the lean premix combustion operation is executed, and allows the in-cylinder injection valve to inject the gaseous fuel immediately after the closure of the intake valve in a high load region of the operation region, where the lean premix combustion operation is executed.

In accordance with a twelfth aspect of the present invention, the gas-fueled internal combustion engine may further include a port injection valve for injecting the gaseous fuel into an intake port, wherein the control unit allows the port injection valve to inject the gaseous fuel prior to closure of an intake valve in a low load region of the operation region, and allows the in-cylinder injection valve to inject the gaseous fuel immediately after closure of the intake valve in a high load region of the operation region.

In accordance with a thirteenth aspect of the present invention, the control unit allows the in-cylinder injection valve to inject the gaseous fuel during the course of a compression stroke to allow stratified combustion of the gaseous fuel in an extremely low load region of the operation region, where the lean premix combustion operation is executed, and allows the in-cylinder injection valve to inject the gaseous fuel during the course of an intake stroke or at the beginning of the compression stroke to allow homogeneous combustion of the gaseous fuel in the operation region above the extremely low load region.

By arranging the ignition device in the direction of a stream of the injected gaseous fuel, the ignition device can directly ignite the stream of the gaseous fuel. Diffusive combustion of the gaseous fuel can be executed by sequentially injecting the gaseous fuel toward a flame (pilot flame) created as the result of ignition. Premix combustion of the gaseous fuel may also be performed by igniting the air-fuel mixture after the gaseous fuel injected from the in-cylinder injection valve has been sufficiently mixed with air.

In accordance with the first aspect of the invention, the premix combustion operation is changed to the diffusive combustion operation when the internal combustion engine begins operating in a high load region. This allows the gaseous fuel to be gently burned and makes it possible to avoid any violent combustion that would otherwise occur as the air-fuel ratio approaches a stoichiometric ratio. The avoidance of violent combustion inhibits increases in the in-cylinder temperature, the cooling loss, and the emission amount of $NO_x$. Thus, high efficiency and low emissions can be realized over a broad engine operation region by executing the lean premix combustion operation in a low load region or a middle load region and performing the diffusive combustion operation in a high load region.

In accordance with the second aspect of the invention, use of hydrogen as the gaseous fuel avoids any production of $CO_2$ and CO, thereby realizing complete zero emissions. By nature, hydrogen combusts at high speed and therefore the combustion of hydrogen occurs rapidly and furiously as the air-fuel ratio approaches a stoichiometric ratio. Nevertheless, the conversion of the engine operation mode to the diffusive combustion operation in the high load region inhibits any reduction in the engine efficiency and any deterioration of the emission control, which would otherwise arise from the rapid combustion.

To be more specific, the combustion of hydrogen becomes rapid if the air excess ratio is smaller than 2, which results in a marked reduction in the engine efficiency and deterioration of the emission control in the lean premix combustion operation. In accordance with the third aspect of the invention, the lean premix combustion operation is executed in the operation region where the air excess ratio can be kept substantially equal to or greater than 2. The lean premix combustion operation is changed to the diffusive combustion operation in the operation region where the air excess ratio cannot be kept substantially equal to or greater than 2. This makes it possible to realize high efficiency and low emissions over a broad engine operation region ranging from the low load region to the high load region.

As is apparent from the foregoing, the air excess ratio heavily affects engine efficiency and emissions control in a hydrogen engine, a representative gas-fueled internal combustion engine. If the air excess ratio is too small, the engine efficiency and the emission control markedly deteriorate. In accordance with the fourth aspect of the invention, the actual air excess ratio during the time of the lean premix combustion operation is compared with a reference value and, if the air excess ratio is below the reference value, the lean premix combustion operation changes to the diffusive combustion operation. This makes it possible to avoid the reduction of the engine efficiency and the deterioration of the emission control, which would otherwise arise from the rapid combustion.

Depending on the operational environment or condition of an engine, it is possible that the combustion of gaseous fuel may occur rapidly even though the air excess ratio is above the reference value. The rapid combustion leads to a sharp increase in the in-cylinder temperature, as a result of which the gas pressure in the combustion chamber (namely, the in-cylinder pressure) is increased very high. In accordance with the fifth aspect of the invention, the in-cylinder pressure-increase rate during the lean premix combustion operation is compared with a reference value and, if the in-cylinder pressure-increase rate is above the reference value, the lean premix combustion operation changes to the diffusive combustion operation. This makes it possible to avoid, in a more convincing manner, the reduction of the engine efficiency and the deterioration of the emission control, which would otherwise arise from the rapid combustion.

In the case where the diffusive combustion operation is selected as the operation mode of the internal combustion engine, the combustion duration becomes equal to, at the shortest, the period during which the gaseous fuel is injected from the in-cylinder injection valve, which means that the combustion duration is prolonged as a matter of course. Particularly, in the high load region, the combustion duration is noticeably prolonged in proportion to the increase in the fuel injection quantity, which acts to hinder the ideal combustion and increase the exhaust loss. In accordance with the sixth aspect of the invention, a fraction of the gaseous fuel is pilot-injected in before the main injection for diffusive combustion. This proportionally shortens the duration of the main injection, thereby avoiding any prolongation of the combustion period.

In accordance with the seventh aspect of the invention, the ignition device is activated after the execution of the pilot injection and before the main injection, whereby the mixture of the pilot-injected gaseous fuel and air is ignited to start a pilot flame that can be used to bring about the diffusive combustion. This increases the in-cylinder temperature during the main injection, thus ensuring that the gaseous fuel injected in the main injection process is ignited in a more reliable manner. This reduces the quantity of unburned gaseous fuel that is discharged. Furthermore, if a fraction of the gaseous fuel is burned prior to the diffusive combustion in this way, it becomes possible to suppress any excessive increase of the in-cylinder pressure during the diffusive combustion process.

The quantity of unburned gaseous fuel that is discharged during the diffusive combustion operation tends to increase as the gaseous fuel injection quantity increases, namely, as the duration of gaseous fuel injection becomes longer. In accordance with the eighth aspect of the invention, the ignition device is activated additionally in the course of the gaseous fuel injection depending on the gaseous fuel injection period. This ensures that the gaseous fuel is ignited in a more reliable manner, thereby reducing the quantity of unburned gaseous fuel that is discharged.

In accordance with the ninth aspect of the invention, a plurality of ignition devices are arranged along the path of the gaseous fuel injected from the in-cylinder injection valve. Thus, any gaseous fuel that is not ignited by the upstream side ignition device can be ignited through the use of the ignition device or devices disposed at the downstream side. This ensures that the gaseous fuel is ignited in a more reliable manner, thereby reducing the quantity of unburned gaseous fuel that is discharged.

In accordance with the tenth aspect of the invention, the in-cylinder injection valve is configured to inject the gaseous fuel in a plurality of directions so that the diffusive combustion can occur at a plurality of locations in the combustion chamber. Thus, it is possible to reduce the quantity of the gaseous fuel injected in a particular direction. This ensures that the gaseous fuel is ignited in a more reliable manner, thereby reducing the quantity of unburned gaseous fuel that is discharged.

In the case where the mixture of the gaseous fuel and the air is combusted at a lean air-fuel ratio, the concentration of the air-fuel mixture should preferably be as homogeneous as possible. To this end, it is desirable to inject the gaseous fuel during the course of an intake stroke so that an ample time can be secured in mixing the gaseous fuel with the air. However, since the gaseous fuel has a large volume, if the load of the internal combustion engine increases and hence the quantity of the injected gaseous fuel increases, the quantity of the air chargeable into the combustion chamber is reduced proportionately. As a result, a high air excess ratio cannot be maintained.

In this regard, the eleventh aspect of the invention is adapted to secure an ample time for mixing the gaseous fuel and the air by injecting the gaseous fuel in advance of the closure of an intake valve, in the low load side operation region where the air can be charged in a sufficient quantity. On the other hand, in the high load side operation region where insufficient intake air is likely to occur, the gaseous fuel is injected immediately after the closure of the intake valve. This makes it possible to secure the time for mixing the gaseous fuel, while eliminating the possibility that charging of the air into the combustion chamber is hindered by the gaseous fuel. Accordingly, the operation region in which the lean premix combustion operation is available can be expanded to the high load side, which makes it possible to enjoy the advantages of the lean premix combustion operation over an even broader operation region.

In accordance with the twelfth aspect of the invention, the port injection valve is employed to execute the gaseous fuel injection in advance of the intake valve closure. In addition to the effects provided by the eleventh invention, this makes it possible to prolong the time for mixing the gaseous fuel and the air and to obtain an air-fuel mixture of increased homogeneousness, as compared to the case where the in-cylinder injection valve alone is used.

In accordance with the thirteenth aspect of the invention, the gaseous fuel is injected by the in-cylinder injection valve during a compression stroke and subjected to stratified combustion. This makes it possible to improve the fuel mileage to a greater extent, as compared to the case where the gaseous fuel is homogeneously combusted.

In accordance with a fourteenth aspect of the present invention, there is provided a control method for a gas-fueled internal combustion engine operable with a gaseous fuel, including: an in-cylinder injection valve that injects the gaseous fuel directly into the combustion chamber; an ignition device arranged in a direction of a stream of the gaseous fuel injected from the in-cylinder injection valve. The control method comprises a step of controlling operation timing of the ignition device and operation timing of the in-cylinder injection valve to change between a lean premix combustion operation mode or diffusive combustion operation mode in accordance with the gaseous fuel injected from the in-cylinder injection valve. The lean premix combustion operation mode for premixing and combusting the gaseous fuel at a lean air-fuel ratio is selected when the internal combustion engine is operated in a prescribed operation region, and the diffusive combustion operation mode for diffusion-combusting the gaseous fuel is selected when the internal combustion engine is operated in a higher load operation region than the prescribed operation region.

BRIEF DESCRIPTION OF THE DRAWINGS

The above and other objects and features of the present invention will become apparent from the following description of embodiments, given in conjunction with the accompanying drawings, in which:

FIG. 12 is a graph showing the relationship of an engine load and a net thermal efficiency in the hydrogen engine shown in FIG. 1 on an operation mode basis;

FIG. 13 is a graph showing the relationship of an engine load and an $NO_x$ emission amount in the hydrogen engine shown in FIG. 1 on an operation mode basis;

FIG. 29 is a flow chart illustrating another example of a routine used in changing engine operation modes in the eighth embodiment of the present invention;

DETAILED DESCRIPTION OF THE PREFERRED EMBODIMENTS

Hereinafter, the first embodiment of the invention will be described with reference to FIGS. 1 through 13.

Figure 1:
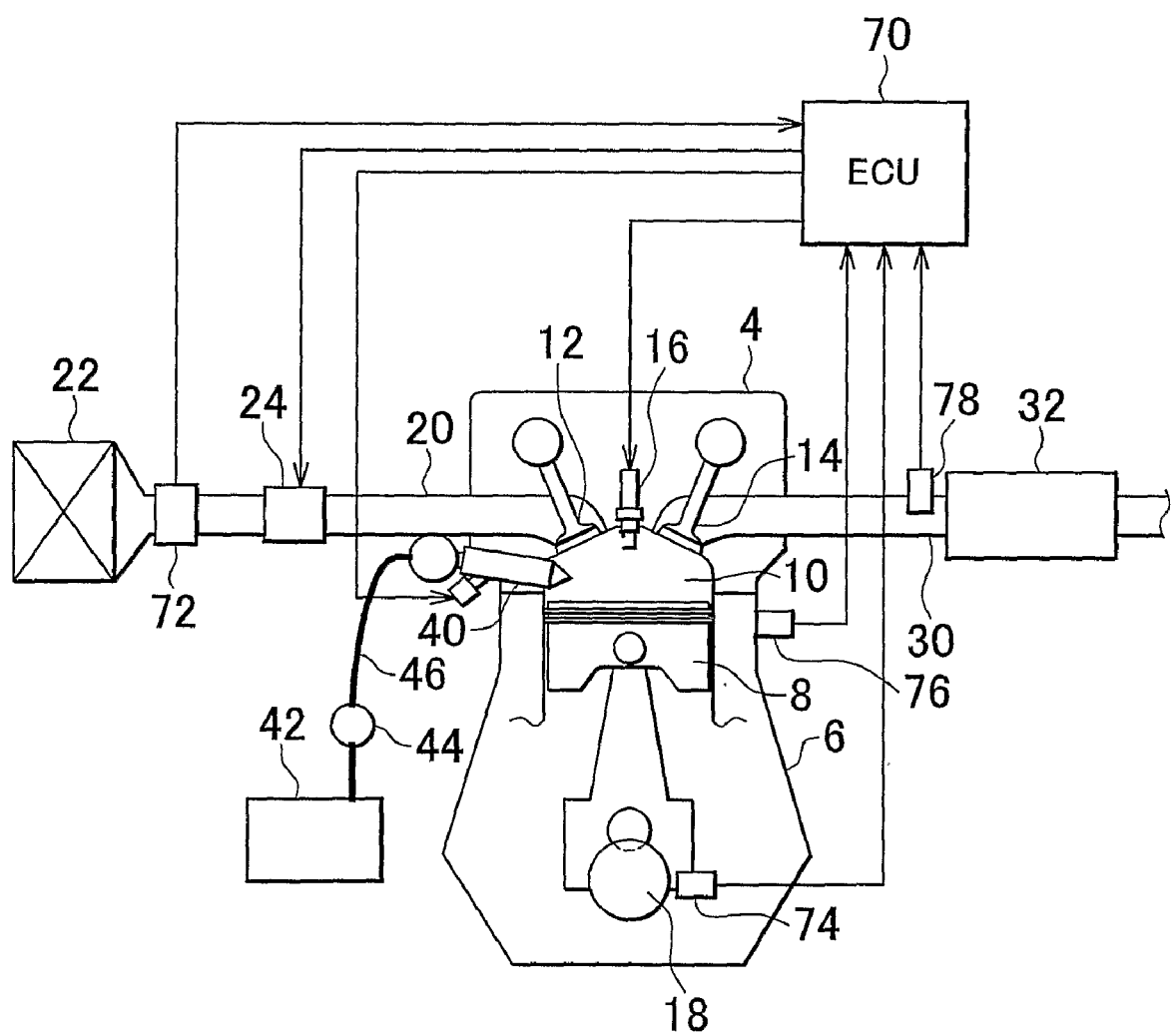
FIG. 1 schematically shows a hydrogen engine in accordance with a first preferred embodiment of the present invention.

A gas-fueled internal combustion engine in accordance with the first embodiment is a hydrogen engine that makes use of hydrogen as a gaseous fuel. The hydrogen engine of this embodiment is schematically shown in FIG. 1. The hydrogen engine includes a cylinder block 6 within which a piston 8 is arranged for reciprocating movement and a cylinder head 4 assembled with the cylinder block 6. The space enclosed by the inner walls of the cylinder block 6 and the cylinder head 4 and also by the top surface of the piston 8 forms a combustion chamber 10. Although a single combustion chamber 10 is illustrated in the drawings, the hydrogen engine is a multi-cylinder engine that includes a plurality of combustion chambers 10.

Connected to the combustion chamber 10 is an intake line 20 through which air is introduced into the combustion chamber 10. The air flows into the intake line 20 via an air cleaner 22 provided at the upstream end of the intake line 20. A throttle 24 for controlling the quantity of air introduced into the combustion chamber 10 is disposed on the intake line 20. An air flow meter 72 for measuring the quantity of air introduced is attached to the intake line 20 upstream of the throttle 24. An intake valve 12 for controlling the communication of the intake line 20 with the combustion chamber 10 is provided at a connection portion therebetween.

Also connected to the combustion chamber 10 is an exhaust line 30 through which a combustion gas in the combustion chamber 10 is discharged. A purification catalyst 32, disposed on the exhaust line 30, purifies the exhaust gas before the exhaust gas is discharged to the atmosphere. An oxygen sensor 78 for measuring the oxygen concentration in the exhaust gas is attached to the exhaust line 30 upstream of the purification catalyst 32. An exhaust valve 14 for controlling the communication of the exhaust line 30 with the combustion chamber 10 is provided at a connection portion therebetween.

An in-cylinder injection valve 40 and an ignition plug 16 are arranged within the combustion chamber 10. The in-cylinder injection valve 40 is connected to a hydrogen supply device 42 via a hydrogen supply pipe 46. The hydrogen supply device 42 may be a high-pressure tank in which hydrogen is stored, a reformer for reforming hydrocarbon-based fuel to generate hydrogen, or a hydrogen occluding material such as metal hydride. In the hydrogen engine of this embodiment, there is no limitation on the kind of the hydrogen supply device 42. A pump 44 for feeding hydrogen to the in-cylinder injection valve 40 is disposed on the hydrogen supply pipe 46. The pump 44 is adapted to pressurize hydrogen up to a pressure level high enough to inject the hydrogen even around a compression top dead center ("TDC"). In the case where the high-pressure hydrogen tank is used as the hydrogen supply device 42, a regulator may take the place of the pump 44, provided that the storage pressure is higher than the injection pressure.

The hydrogen engine is further provided with an electronic control unit ("ECU") 70 as a control unit thereof. Connected to an output part of the electronic control unit 70 are the in-cylinder injection valve 40, the ignition plug 16, the throttle 24 and other devices. In addition to the oxygen sensor 78 and the air flow meter 72, a crank angle sensor 74, a knock sensor 76 and other kinds of sensors are connected to an input part of the electronic control unit 70. Based on outputs of the respective sensors, the electronic control unit 70 is adapted to actuate the respective devices under a prescribed control program.

Figure 2:
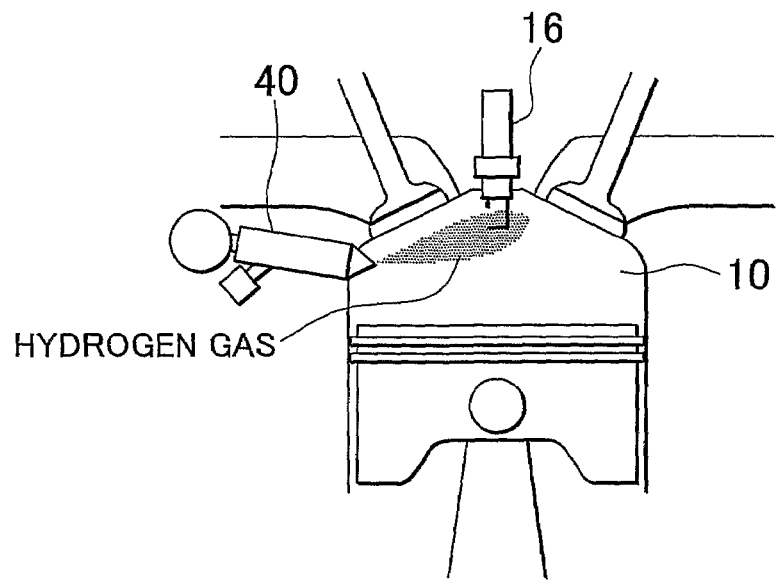
FIG. 2 is an enlarged view illustrating a surrounding configuration of a combustion chamber in the hydrogen engine shown in FIG. 1.
Figure 3:
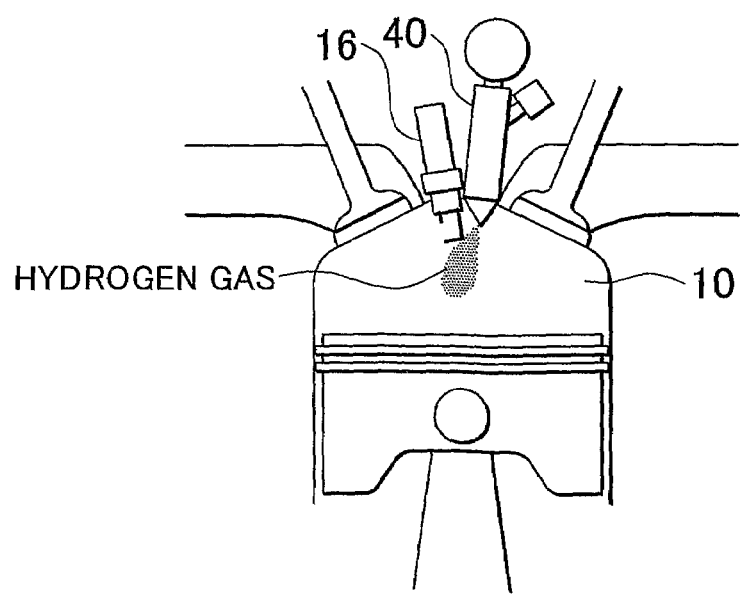
FIG. 3 is an enlarged view illustrating one modification of the surrounding configuration of the combustion chamber in the hydrogen engine shown in FIG. 1.

Next, the major parts included in the hydrogen engine of this embodiment will be described. FIG. 2 is an enlarged view illustrating the surrounding configuration of the combustion chamber 10 in the hydrogen engine. As illustrated in FIG. 2, the ignition plug 16 is disposed at the apex of the combustion chamber 10. The in-cylinder injection valve 40 is disposed on a side wall of the combustion chamber 10 in such a manner that the injection hole thereof is oriented to inject hydrogen toward the ignition plug 16. The hydrogen is hardly mixed with the air and, therefore, hydrogen injected from the in-cylinder injection valve 40 forms a stream. Alternatively, the in-cylinder injection valve 40 and the ignition plug 16 may be arranged as shown in FIG. 3. In this arrangement, the in-cylinder injection valve 40 and the ignition plug 16 are all disposed at the apex of the combustion chamber 10. The injection hole of the in-cylinder injection valve 40 is oriented to ensure that the stream of hydrogen can pass by the tip end of the ignition plug 16.

In accordance with the configurations illustrated in FIGS. 2 and 3, the stream of hydrogen can be directly ignited by actuating the ignition plug 16 while hydrogen is being injected from the in-cylinder injection valve 40. In this case, the injection timing of the hydrogen is set within a range from several degrees earlier than the compression TDC to several degrees later than the compression TDC, and the ignition timing of the ignition plug 16 is set to be coincident with, or slightly retarded with respect to, the hydrogen injection timing. With the described arrangement, the ignition plug 16 produces a spark in the midst of the injected hydrogen stream. This does not matter because hydrogen has a combustibility range as broad as 4-75 percent by volume and can be readily ignited even in an extremely rich atmosphere. The ignition of hydrogen starts a flame, namely, a pilot fire. By injecting hydrogen toward the flame in succession, the hydrogen is diffusion-mixed with the air and continues to be combusted. This means that, in accordance with the hydrogen engine of this embodiment, the diffusive combustion can be selected as the hydrogen combustion type. Hydrogen itself is hard to ignite and is, therefore, unsuitable for the diffusive combustion in its nature. In this embodiment, however, the diffusive combustion of hydrogen is assisted by the igniting action of the ignition plug 16, in view of which the expression "plug-assisted hydrogen-diffusive combustion" will be used hereinbelow.

As the type of hydrogen combustion, the hydrogen engine of this embodiment may adopt a premix combustion as is available in a typical internal combustion engine, as well as the diffusive combustion noted above. Specifically, after hydrogen injected from the in-cylinder injection valve 40 is sufficiently mixed with the air, the ignition plug 16 is activated to ignite the hydrogen-air mixture. In this way, the premix combustion can be carried out. At this time, the air-fuel ratio of the mixture may be set to a value significantly leaner than a stoichiometric ratio. This is because hydrogen has a combustibility range as broad as 4-75 percent by volume, as stated above. In accordance with the hydrogen engine of this embodiment, it is possible to perform an engine operation in which hydrogen is combusted by premixing the hydrogen with the air at a lean air-fuel ratio, namely, a lean premix combustion operation.

In the case where hydrogen is premixed and combusted at a lean air-fuel ratio, the concentration of the air-fuel mixture is preferably to be made as uniform as possible. To this end, there is a need to secure an ample time in mixing hydrogen with the air. With the hydrogen engine of this embodiment, the time required for homogeneously mixing hydrogen with the air in the combustion chamber 10 can be secured by injecting hydrogen during the intake stroke, which assures homogeneous combustion of hydrogen. Such homogeneous combustion of hydrogen at a lean air-fuel ratio will be hereinafter referred to as "hydrogen-homogenized lean burn" or simply "homogeneous lean burn".

Figure 32:
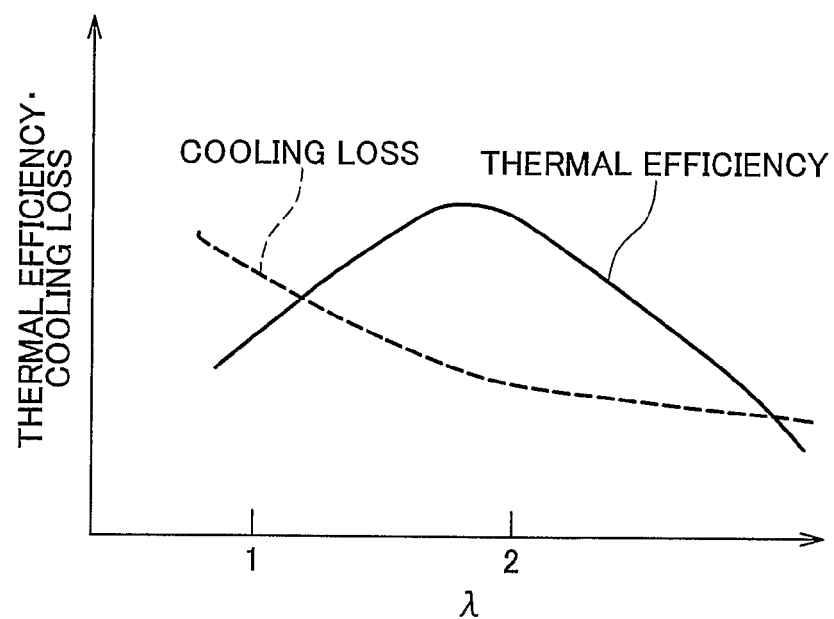
FIG. 32 is a graph representing the relationship of an air excess ratio $\lambda$, a thermal efficiency and a cooling loss in a typical hydrogen engine.
Figure 33:
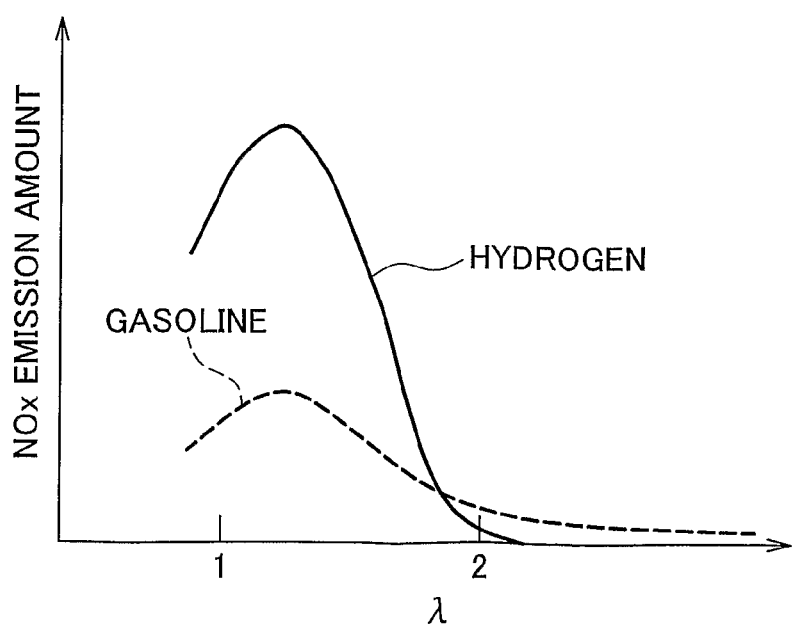
FIG. 33 is a graph representing the relationship of an air excess ratio $\lambda$ and an $NO_x$ emission amount in typical hydrogen and gasoline engines.
Figure 34:
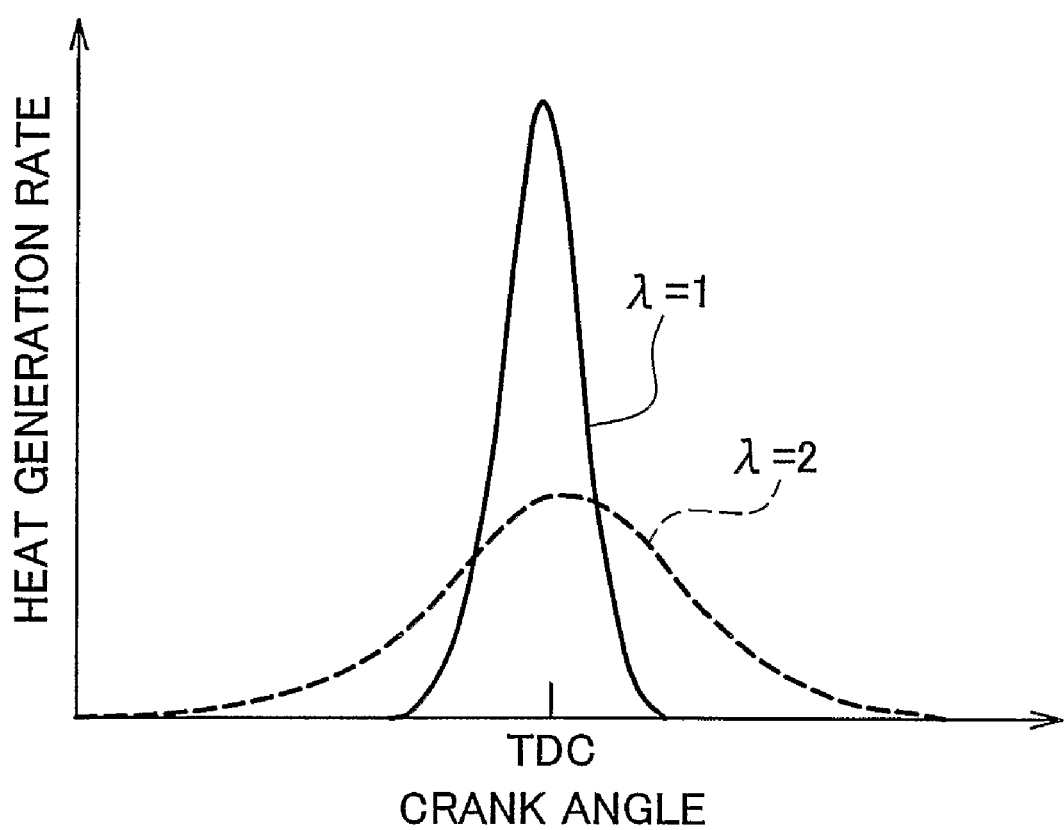
FIG. 34 is a graph representing the variation of a heat generation rate with respect to a crank angle in a typical hydrogen engine.

The hydrogen-homogenized lean burn reduces pumping loss and cooling loss so that the hydrogen engine can operate with good fuel mileage and high efficiency. Furthermore, the hydrogen-homogenized lean burn lowers the combustion temperature to thereby suppress the $NO_x$ emission amount to about zero. These effects appear conspicuously when the hydrogen engine is operated in a relatively low or middle load region. The advantages offered by the hydrogen-homogenized lean burn decrease as the engine load increases. This is because hydrogen has a large volume and, therefore, if the hydrogen injection quantity is increased in response to the engine load growing high, the air excess ratio $\lambda$ cannot be kept high due to the reduction in the quantity of the air introduced into the combustion chamber 10. As already stated in the section of "Background of the Invention" with reference to FIGS. 32 to 34, cooling loss is sharply increased and the $NO_x$ emission amount soars drastically if the air excess ratio $\lambda$ becomes smaller than 2.

In order to secure the advantages of the hydrogen-homogenized lean burn over an even broader engine operation region, it is necessary to inhibit the reduction of the air excess ratio $\lambda$, which stems from the increase in the hydrogen injection quantity. In the hydrogen engine of this embodiment, therefore, when the hydrogen-homogenized lean burn is executed at a low load operation region where the air excess ratio $\lambda$ remains sufficiently great, hydrogen is injected while the intake stroke is in progress as described above, i.e., before the intake valve 12 is closed, thereby securing an ample time for allowing hydrogen to be mixed with the air. However, at a high load operation region, where the air excess ratio $\lambda$ cannot be kept equal to or greater than 2 by the injection of hydrogen during the course of intake stroke, the hydrogen engine is designed to inject hydrogen through the in-cylinder injection valve 40 just after the intake valve 12 closes, i.e., in the early stage of a compression stroke. In the following description, the former type of hydrogen injection will be referred to as "intake-stroke injection" and the latter type of hydrogen injection will be called "post-intake-valve-closure injection", when it is necessary to particularly distinguish them.

Figure 4:
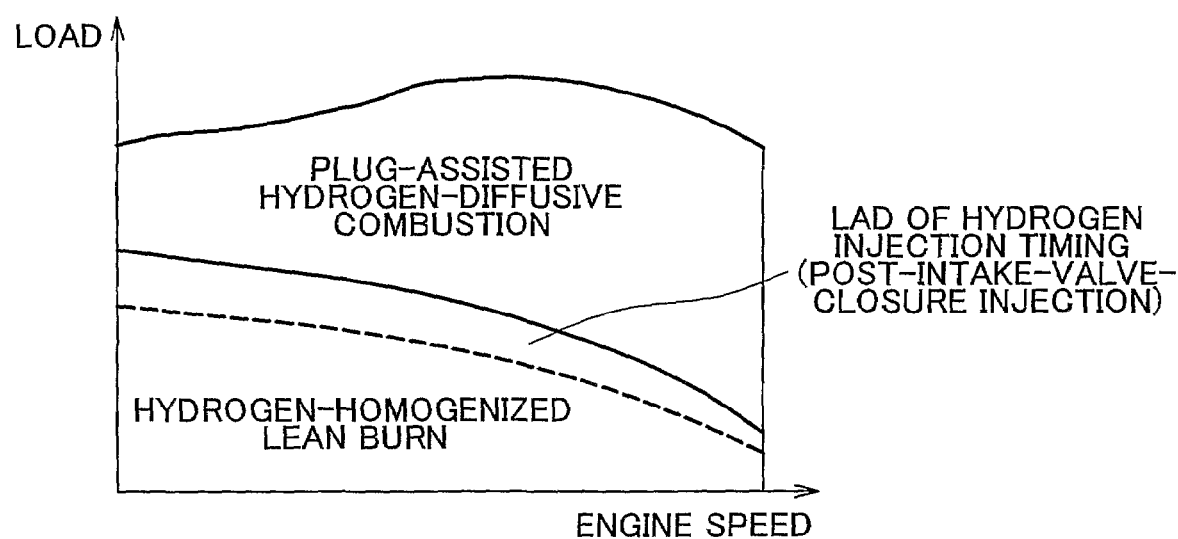
FIG. 4 illustrates a map used in selecting an engine operation mode in the hydrogen engine in accordance with the first embodiment of the present invention.

FIG. 4 illustrates a map used in selecting an operation mode of the hydrogen engine of this embodiment. The map is a multi-dimensional map whose axes represent the engine load and the engine speed, respectively. The map is made out such that, as noted above, the post-intake-valve-closure injection is selected when the hydrogen-homogenized lean burn is executed at a higher load operation. In this map, the operation region where the post-intake-valve-closure injection is selected stands for the one where the air excess ratio $\lambda$ cannot be kept equal to or greater than 2 by the intake-stroke injection of hydrogen, and the intake-stroke injection is selected at a lower load operation region than the above-mentioned operation region.

Figure 5:
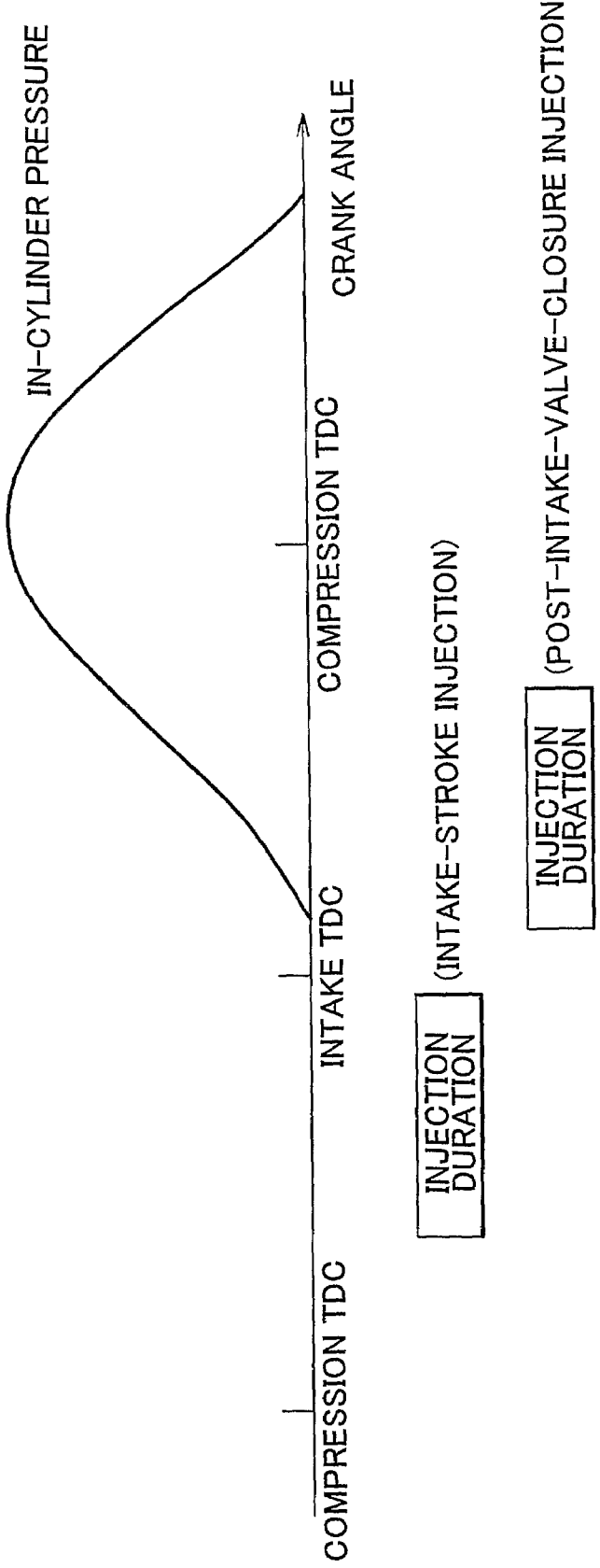
FIG. 5 is a timing diagram representing an injection timing with respect to a waveform of an in-cylinder pressure during a hydrogen-homogenized lean burn operation in the first embodiment of the present invention.

FIG. 5 concretely illustrates the injection timing during the hydrogen-homogenized lean burn operation, with respect to the waveform of the in-cylinder pressure. As illustrated in FIG. 5, during the course of the intake-stroke injection selected at a relatively low load operation, the injection timing is advanced with respect to the closing time of the intake valve 12 (the time when the in-cylinder pressure begins to increase). In the process of the post-intake-valve-closure injection selected at a relatively high load operation, the injection timing is retarded with respect to the closing time of the intake valve 12. Although not shown, the ignition timing is set to be immediately before the compression TDC as in a typical gasoline engine.

The post-intake-valve-closure injection can prevent hydrogen from hindering the introduction of the air into the combustion chamber 10, thus making it possible for the air to be fully charged in the combustion chamber 10. Furthermore, the time required for mixing hydrogen with the air can be sufficiently secured by commencing the hydrogen injection immediately after the intake valve 12 is closed. Thus, even at the operation region where the air excess ratio $\lambda$ cannot be kept equal to or greater than 2 by the intake-stroke injection, the post-intake-valve-closure injection makes it possible to perform the hydrogen-homogenized lean burn operation while maintaining the air excess ratio $\lambda$ equal to or greater than 2.

However, there is also a limit on the operation region where the air excess ratio $\lambda$ can be kept equal to or greater than 2 by the post-intake-valve-closure injection. In other words, if the engine load keeps increasing to a very high load region, it becomes impossible to keep the air excess ratio $\lambda$ equal to or greater than 2 because the intake air quantity reaches its limit whereas the hydrogen injection quantity continues to increase in proportion to the engine load. For the very reason, as can be seen in the map of FIG. 4, the hydrogen engine of this embodiment is designed to change its operation mode from the hydrogen-homogenized lean burn operation to the plug-assisted hydrogen-diffusive combustion operation, in such a high load region where the air excess ratio $\lambda$ cannot be kept equal to or greater than 2 even by the post-intake-valve-closure injection.

Figure 6:
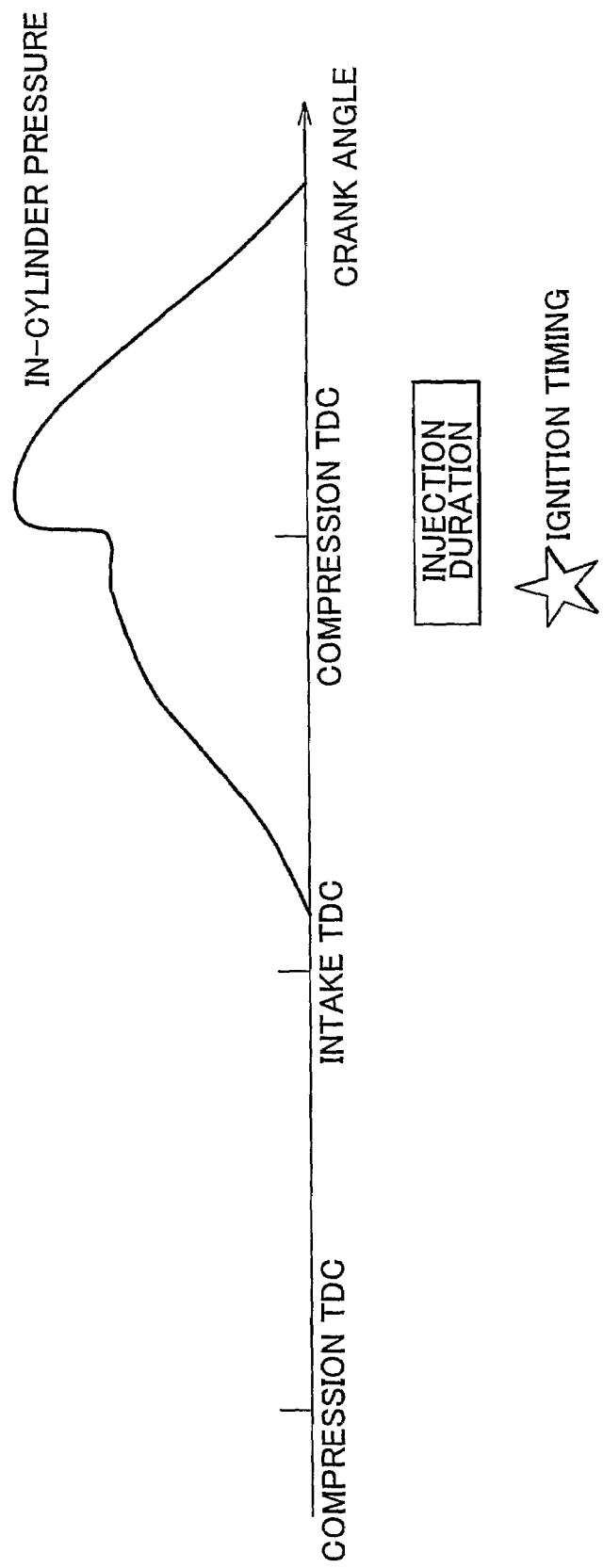
FIG. 6 is a timing diagram representing an injection timing and an ignition timing with respect to a waveform of an in-cylinder pressure during a plug-assisted hydrogen-diffusive combustion operation in the first embodiment of the present invention.

FIG. 6 is a timing diagram concretely showing the injection timing and the ignition timing during the plug-assisted hydrogen-diffusive combustion operation, with respect to a waveform of the in-cylinder pressure. As shown in FIG. 6, the injection timing in the plug-assisted hydrogen-diffusive combustion is set to extend over a period from a time before the compression TDC to a time after the compression TDC and the ignition timing is set to be coincident with, or slightly retarded with respect to, the beginning of injection.

Referring now to FIGS. 8 through 13, description will be given to the advantages offered by changing the operation modes depending on the engine load in accordance with the map shown in FIG. 4, particularly the advantages of the conversion from the hydrogen-homogenized lean burn operation to the plug-assisted hydrogen-diffusive combustion operation.

Figure 8:
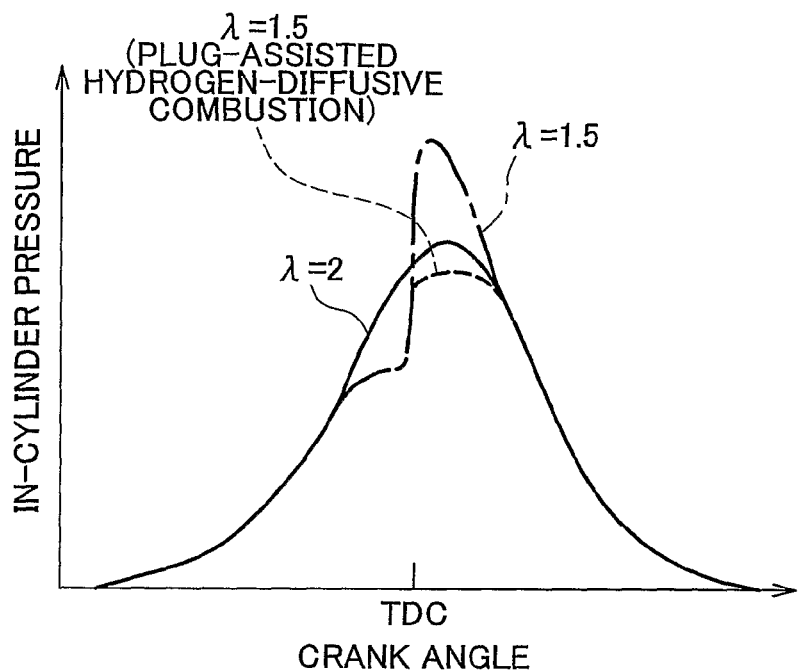
FIG. 8 is a graph showing the variation of an in-cylinder pressure with respect to a crank angle in the hydrogen engine shown in FIG. 1.

FIG. 8 is a graph showing the variation of the in-cylinder pressure with respect to the crank angle in the hydrogen engine. In this graph, the solid line represents the variation of the in-cylinder pressure when the hydrogen-homogenized lean burn operation is performed under the condition of $\lambda=2$, whereas the dash-dotted line indicates the variation of the in-cylinder pressure when the hydrogen-homogenized lean burn operation is performed under the condition of $\lambda=1.5$. As can be seen in the graph, in case of the hydrogen-homogenized lean burn operation, the in-cylinder pressure drastically increases as the air excess ratio $\lambda$ becomes smaller than 2. This is because the combustion rate of hydrogen is extremely high and the combustion occurs rapidly and furiously as the air-fuel ratio comes closer to a stoichiometric ratio.

Figure 9:
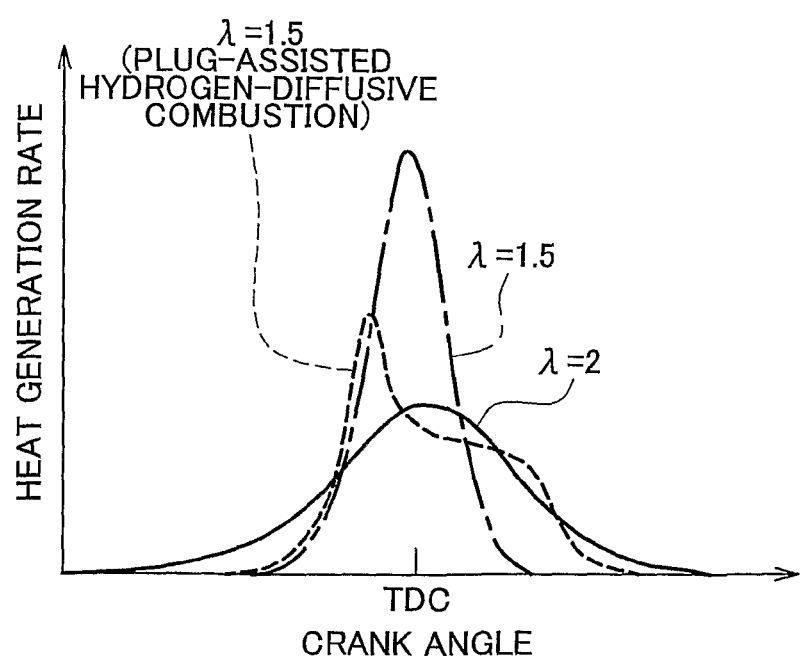
FIG. 9 is a graph showing the variation of a heat generation rate with respect to a crank angle in the hydrogen engine shown in FIG. 1.

The rapid combustion of hydrogen leads to a sharp variation of the heat generation rate with respect to the crank angle and also creates a higher peak. FIG. 9 is a graph showing the variation of the heat generation rate with respect to the crank angle in the hydrogen engine. The solid line represents the variation of the heat generation rate when the hydrogen-homogenized lean burn operation is performed under the condition of $\lambda=2$, whereas the dash-dotted line indicates the variation of the heat generation rate when the hydrogen-homogenized lean burn operation is performed under the condition of $\lambda=1.5$. As can be seen in the graph, hydrogen is combusted rapidly within an extremely short period of time if the air excess ratio $\lambda$ becomes smaller than 2 ($\lambda=1.5$ in the graph).

In the graph of FIG. 8, the broken line represents the variation of the in-cylinder pressure when the plug-assisted hydrogen-diffusive combustion operation is performed under the condition of $\lambda=1.5$. If this is compared with the case where the hydrogen-homogenized lean burn operation is executed under the same condition of $\lambda=1.5$, it can be appreciated that the plug-assisted hydrogen-diffusive combustion operation significantly lowers the peak of the in-cylinder pressure. This is because the plug-assisted hydrogen-diffusive combustion allows hydrogen to be burned more slowly than in the premix combustion, thus inhibiting the rise of the combustion temperature. In the graph of FIG. 9, the broken line represents the variation of the heat generation rate when the plug-assisted hydrogen-diffusive combustion operation is performed under the condition of $\lambda=1.5$. As is apparent from the comparison with the case where the hydrogen-homogenized lean burn operation is executed under the same condition of $\lambda=1.5$, the plug-assisted hydrogen-diffusive combustion can prolong the duration of hydrogen combustion and also can lower the peak of the heat generation rate.

As indicated above, under the hydrogen-homogenized lean burn condition, the combustion occurs rapidly as the air excess ratio $\lambda$ becomes smaller than 2 and the air-fuel ratio comes closer to a stoichiometric ratio. Such rapid combustion can be avoided by changing the hydrogen-homogenized lean burn operation to the plug-assisted hydrogen-diffusive combustion operation. The avoidance of rapid combustion helps suppress the rise of the in-cylinder temperature and increase of the cooling loss, which in turn keeps the net thermal efficiency high and suppresses the increase of the $NO_x$ emission amount. Furthermore, the in-cylinder pressure has a low peak, which helps to prevent generation of a flame noise and reduce any damage to an engine. The relationship of the air excess ratio $\lambda$ and the net thermal efficiency in each operation mode is as concretely shown in FIG. 10. Moreover, the relationship of the air excess ratio $\lambda$ and the $NO_x$ emission amount in each operation mode is as specifically shown in FIG. 11.

Figure 10:
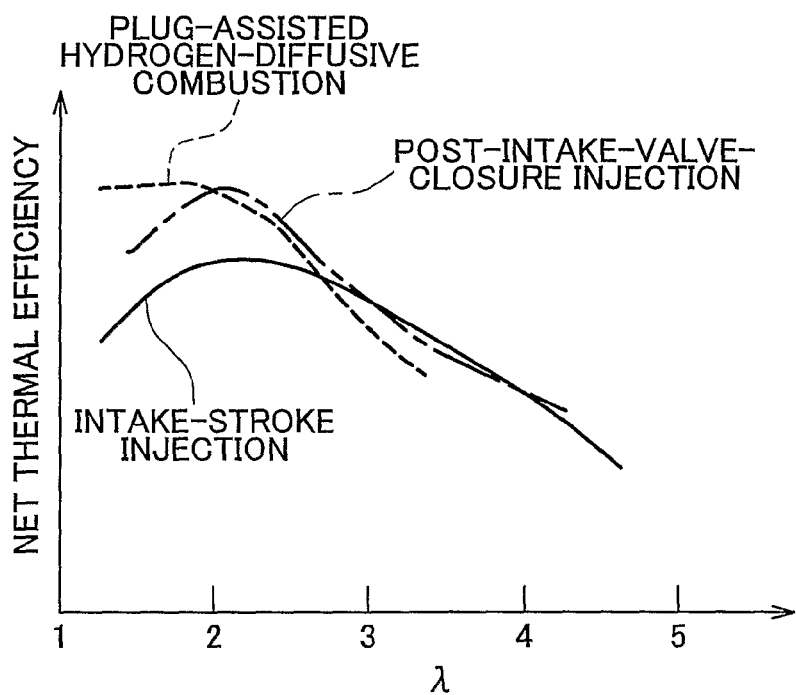
FIG. 10 is a graph showing the relationship of an air excess ratio $\lambda$ and a net thermal efficiency in the hydrogen engine shown in FIG. 1 on an operation mode basis.
Figure 11:
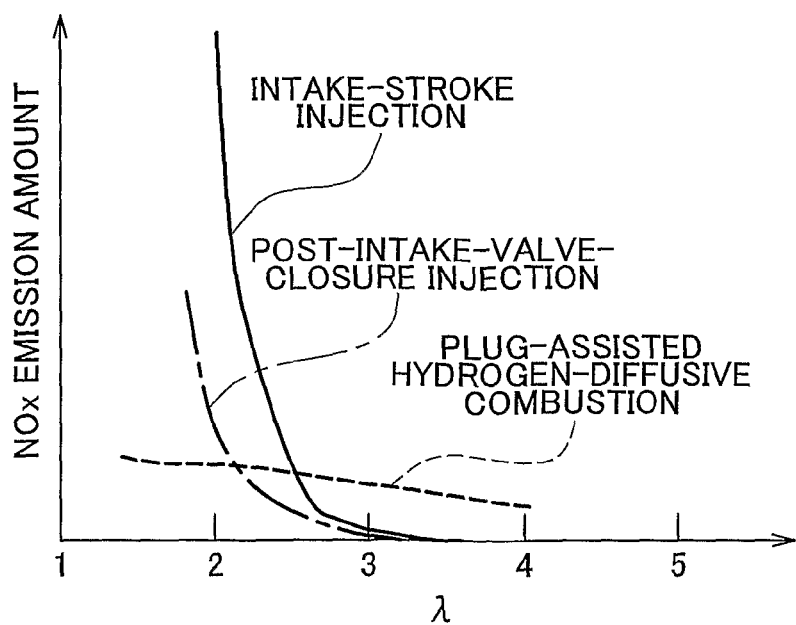
FIG. 11 is a graph showing the relationship of an air excess ratio $\lambda$ and an $NO_x$ emission amount in the hydrogen engine shown in FIG. 1 on an operation mode basis.

FIG. 10 is a graph showing the relationship of the air excess ratio $\lambda$ and the net thermal efficiency for each operation mode and FIG. 11 is a graph showing the relationship of the air excess ratio $\lambda$ and the $NO_x$ emission amount for each operation mode. In the graphs, the intake-stroke injection, the post-intake-valve-closure injection and the plug-assisted hydrogen-diffusive combustion are indicated by a solid line, a dash-dotted line and a broken line, respectively. As can be aware from these graphs, in the case where the air excess ratio $\lambda$ is equal to or greater than 2, it is advantageous to select the hydrogen-homogenized lean burn, such as the intake-stroke injection and the post-intake-valve-closure injection, which allows the fuel to be homogeneously mixed. However, in the case where the air excess ratio $\lambda$ is smaller than 2, it is advantageous to adopt the plug-assisted hydrogen-diffusive combustion in view of both the net thermal efficiency and the $NO_x$ emission amount.

The hydrogen engine of this embodiment is adapted to change any of the three operation modes to another depending on the engine load in accordance with the map shown in FIG. 4. The graphs of FIG. 12 show the relationships of the engine load and the net thermal efficiency for respective operation modes and the graphs of FIG. 13 depict the relationships of the engine load and the $NO_x$ emission amount for respective operation modes. In the graphs, the intake-stroke injection, the post-intake-valve-closure injection and the plug-assisted hydrogen-diffusive combustion are indicated by a solid line, a dash-dotted line and a broken line, respectively. As can be seen in these graphs, the engine will be operated by the intake-stroke injection while the engine load is at a lower region. As the engine load grows heavier up to a certain level, the intake-stroke injection operation will be changed to the post-intake-valve-closure injection operation, which will make it possible to continuously carry out the hydrogen-homogenized lean burn even in a higher load region than that of the intake-stroke injection operation. If the engine load is further increased, the post-intake-valve-closure injection operation will be changed to the plug-assisted hydrogen-diffusive combustion operation, whereby the engine can be operated with a high efficiency even in a higher load region than that of the hydrogen-homogenized lean burn and the $NO_x$ emission can be suppressed to a low level.

As described above, the hydrogen engine of this embodiment is able to keep its efficiency high over a broad operation region ranging from the low load region to the high load region and further to suppress the $NO_x$ emission to a low level, by changing the operation mode from one to another among the three operation modes, namely, the intake-stroke injection operation, the post-intake-valve-closure injection operation and the plug-assisted hydrogen-diffusive combustion operation, in accordance with the map shown in FIG. 4.

Such operations of the hydrogen engine are controlled by the ECU 70 that also determines the conversion of the operation modes. In the hydrogen engine of this embodiment, the conversion of the operation modes is executed in accordance with a routine of the flow chart shown in FIG. 7.

Figure 7:
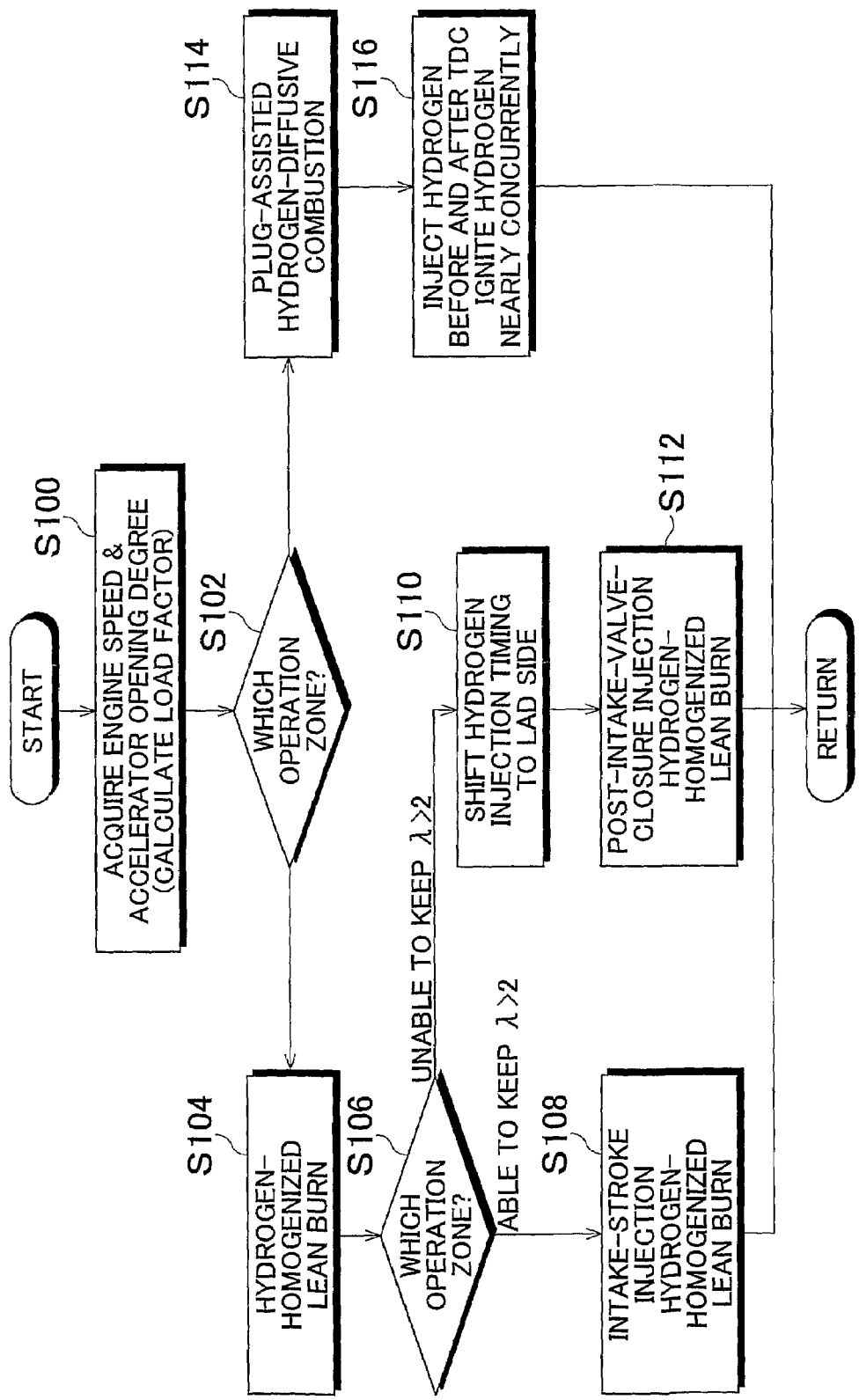
FIG. 7 is a flow chart illustrating a routine used in changing engine operation modes in the hydrogen engine in accordance with the first embodiment of the present invention.

At step S100, which is the first step of the routine illustrated in FIG. 7, an engine speed and an accelerator opening degree are acquired as of the present time. The electronic control unit 70 calculates an engine load (load factor) based on the engine speed and the accelerator opening degree.

At step S102, it is determined to which operation region in the map of FIG. 4 does the current operating condition belong, the current operating condition being decided based on the engine speed acquired at step S100 and the engine load calculated at step S100. As can be seen from the map shown in FIG. 4, if the engine is operating in the low load region or the middle load region, a hydrogen-homogenized lean burn operation is selected (step S104). On the other hand, if the engine is operating in the high load region, a plug-assisted hydrogen-diffusive combustion operation is selected (step S114).

the case where the hydrogen-homogenized lean burn operation is selected, the engine operation load is determined once again (step S106). If the engine is operating in the lower load side of the operation region where the hydrogen-homogenized lean burn operation is selected, i.e., in an operation region where the air excess ratio $\lambda$ can be kept equal to or greater than 2 by the intake-stroke injection, the duration of hydrogen injection is set to have the timing as shown at the upper portion in FIG. 5 and then the hydrogen-homogenized lean burn operation is performed through the intake-stroke injection (step S108).

On the other hand, if the engine is operating in the higher load side of the operation region where the hydrogen-homogenized lean burn operation is selected, i.e., in an operation region where the air excess ratio $\lambda$ cannot be kept equal to or greater than 2 by the intake-stroke injection, the hydrogen injection timing is retarded and the duration of hydrogen injection is set to have the timing as shown at the lower portion in FIG. 5 (step S110). Then the hydrogen-homogenized lean burn operation is performed by the post-intake-valve-closure injection (step S112).

Meanwhile, in the case where the plug-assisted hydrogen-diffusive combustion operation is selected as the result of determination made at step S102, the duration of hydrogen injection is set to extend over a period from a time before the compression TDC to a time after the compression TDC as depicted in FIG. 6 and the ignition plug 16 is activated substantially concurrently with the beginning of the hydrogen injection (step S116).

In this embodiment, the routine shown in FIG. 7 is executed by means of the ECU 70, thereby realizing a "control unit" in accordance with the first and the third aspect of the present invention.

Next, a second embodiment of the present invention will be described with reference to FIG. 14.

As in the first embodiment, a gas-fueled internal combustion engine of this embodiment is a hydrogen engine that uses hydrogen as its gaseous fuel. The hydrogen engine of this embodiment is schematically shown in FIG. 14 wherein the same parts as those of the hydrogen engine illustrated in FIG. 1 are designated with like reference numerals. In the following, redundant descriptions will be omitted or briefly presented regarding the same parts as those in the first embodiment.

Figure 14:
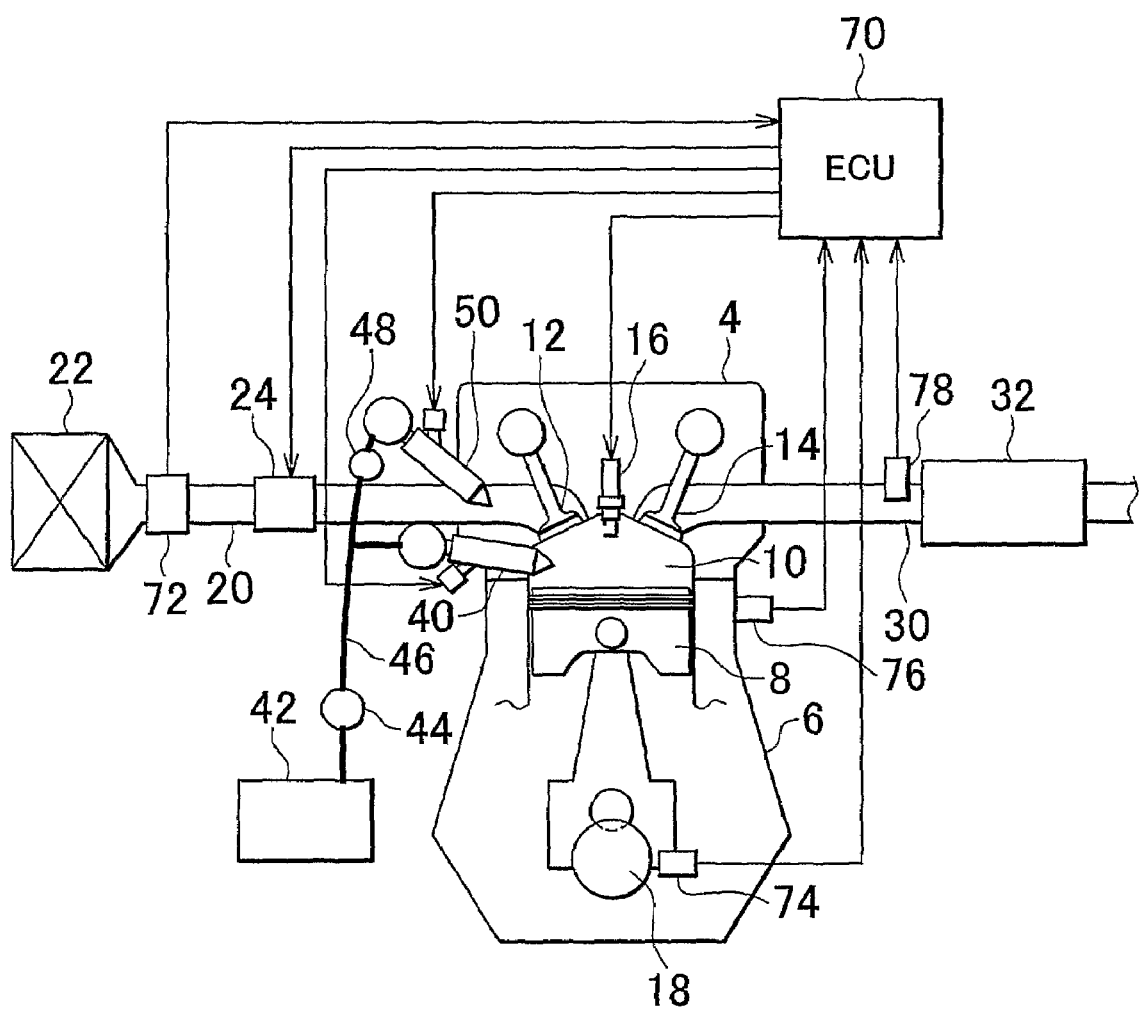
FIG. 14 schematically shows a hydrogen engine in accordance with a second embodiment of the present invention.

As shown in FIG. 14, the hydrogen engine of this embodiment includes a port injection valve 50 disposed on the intake line 20, more concretely on an intake port, in addition to the in-cylinder injection valve 40 arranged in the combustion chamber 10. In this embodiment, the hydrogen supply pipe 46 extending from the hydrogen supply device 42 is bifurcated into two branches at the downstream side of the pump 44, one of the branches being connected to the in-cylinder injection valve 40 and the other being connected to the port injection valve 50. A regulator 48 for reducing the pressure of hydrogen is disposed on the branch of the hydrogen supply pipe 46 leading to the port injection valve 50. Like the in-cylinder injection valve 40, the actuation of the port injection valve 50 is controlled by the ECU 70.

With the arrangement illustrated in FIG. 14, hydrogen can be injected directly into the combustion chamber 10 through the actuation of the in-cylinder injection valve 40 and also into the intake port by the actuation of the port injection valve 50. The injection of the hydrogen into the intake port results in a time lag from the injection to the combustion and, therefore, the mixing of the hydrogen with the air is expedited correspondingly, as compared with the direct injection of hydrogen into the combustion chamber 10.

As in the first embodiment, the hydrogen engine of this embodiment is adapted to select one of the engine operation modes based on the map shown in FIG. 4 and the conversion of the engine operation modes is executed in accordance with the routine illustrated in FIG. 7. Inasmuch as hydrogen can be injected into the intake port in this embodiment, the port injection valve 50 is actuated in lieu of the in-cylinder injection valve 40 during the intake-stroke injection operation of the hydrogen-homogenized lean burn operation. In other words, the hydrogen engine of this embodiment uses the port injection valve 50 during the intake-stroke injection operation but actuates the in-cylinder injection valve 40 during the post-intake-valve-closure injection operation and the plug-assisted hydrogen-diffusive combustion operation.

Such a selective use of the injection valves depending on the operation mode makes it possible to further improve engine efficiency and emission control in the operation region where hydrogen can be injected during the intake stroke. In the hydrogen engine shown in FIG. 1, it is necessary to keep the pressure of hydrogen high at all times and therefore a great deal of energy is consumed in increasing the pressure of hydrogen. In contrast, if the port injection valve 50 is additionally used as in this embodiment, the pressure of hydrogen may be reduced down to a low level in the middle load operation and the energy supplied to the pump 44 may be reduced correspondingly. Moreover, in the event that a high pressure tank is used as the hydrogen supply device 42 and a regulator is employed in place of the pump 44 in the hydrogen engine shown in FIG. 1, hydrogen whose pressure is lower than the injection pressure of the in-cylinder injection valve 40 cannot be used. In contrast, in accordance with the hydrogen engine of this embodiment, the pressure of the hydrogen can be reduced down to the injection pressure of the port injection valve 50 and, correspondingly, the hydrogen in the high-pressure tank can be used in a more effective manner.

In this embodiment, the routine shown in FIG. 7 is executed by the ECU 70 of the hydrogen engine illustrated in FIG. 14, thereby realizing a "control unit" in accordance with the twelfth aspect of the present invention.

Hereinafter, a third embodiment of the present invention will be described with reference to FIG. 15.

As in the first embodiment, a gas-fueled internal combustion engine of this embodiment is a hydrogen engine that uses hydrogen as its gaseous fuel. The hydrogen engine of this embodiment has the configuration as shown in FIG. 1 or FIG. 14 and is adapted to select its operation mode based on the map illustrated in FIG. 4. The difference between this embodiment and the first embodiment resides at the routine for changing the operation modes.

Figure 15:
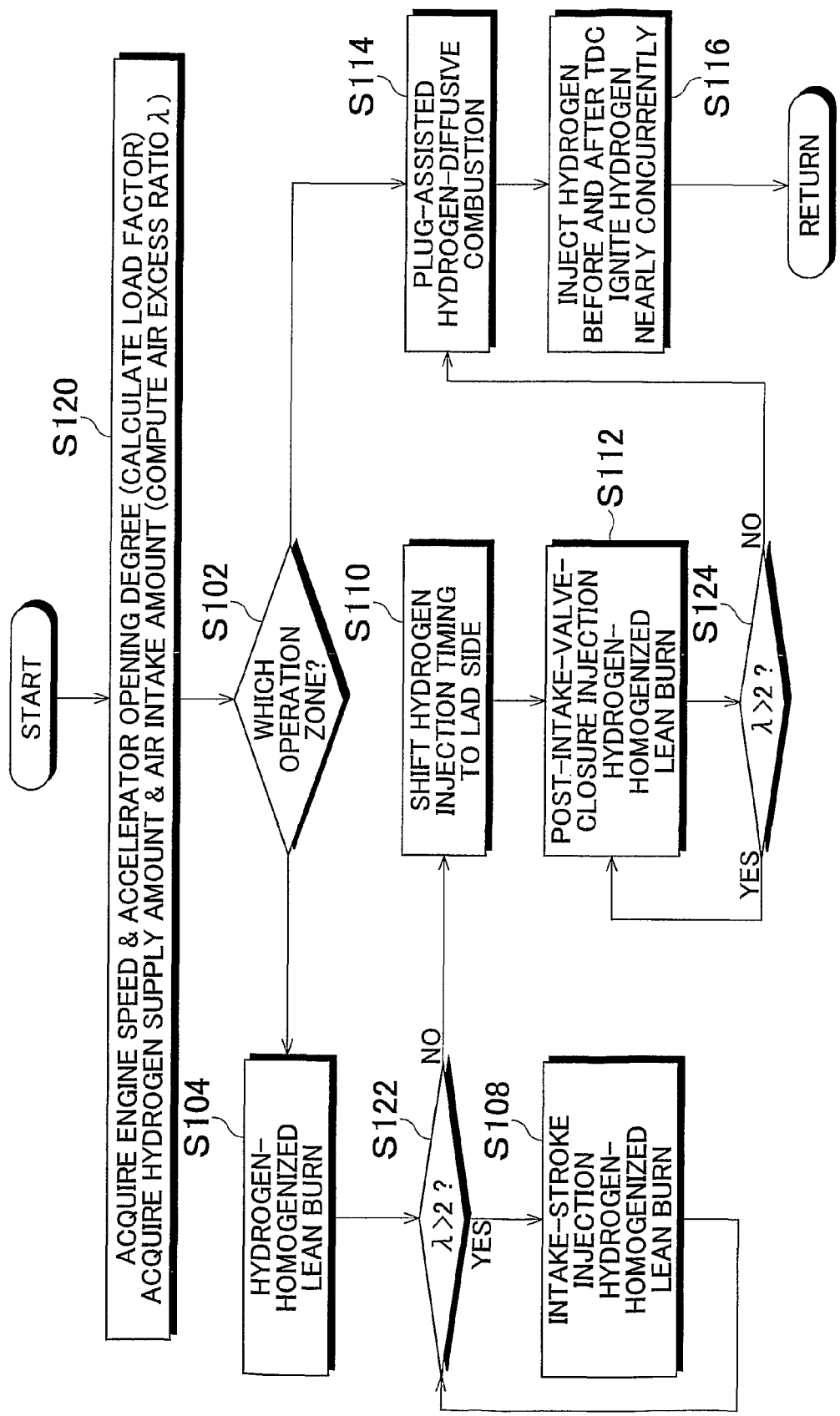
FIG. 15 is a flow chart illustrating a routine used in changing engine operation modes in a third embodiment of the present invention.

In this embodiment, the conversion of the engine operation modes is executed in accordance with the routine depicted in FIG. 15 wherein the same processing tasks as done in the routine of FIG. 7 are designated by like step numbers.

At step S120, which is the first step of the routine illustrated in FIG. 15, the engine speed and the accelerator opening degree are acquired as of the present time. The ECU 70 calculates the engine load (load factor) based on the engine speed and the accelerator opening degree. Also acquired at step S120 are the hydrogen supply amount and the air intake amount as of the present time. The hydrogen supply amount can be measured by using a hydrogen flow meter (not shown) disposed on the hydrogen supply pipe 46. The ECU 70 calculates an air excess ratio $\lambda$ based on the hydrogen supply amount and the air intake amount.

At step S102, it is determined to which operation region in the map does the current operating condition belong. If the engine is operating in the low load region or the middle load region, a hydrogen-homogenized lean burn operation is selected (step S104). On the other hand, if the engine is operating in the high load region, a plug-assisted hydrogen-diffusive combustion operation is selected (step S114).

In the event that the plug-assisted hydrogen-diffusive combustion operation is selected, the duration of hydrogen injection is set to extend over a period from a time before the compression TDC to a time after the compression TDC as depicted in FIG. 6 and the ignition plug 16 is activated substantially concurrently with the beginning of the hydrogen injection (step S116).

If the hydrogen-homogenized lean burn operation is selected as the result of determination at step S102, it is then determined whether or not the air excess ratio $\lambda$ is greater than 2 (step S122). If the determination reveals that $\lambda$ is greater than 2, the duration of hydrogen injection is set to have the timing as shown at the upper portion in FIG. 5 and then the hydrogen-homogenized lean burn operation is performed by the intake-stroke injection (step S108).

The determination at step S122 continues to be executed while the intake-stroke injection operation is selected as the engine operation mode. If the determination reveals that λ is equal to or smaller than 2, the hydrogen injection timing is retarded and the duration of hydrogen injection is set to have the timing as shown at the lower portion in FIG. 5 (step S110). Then the hydrogen-homogenized lean burn operation is performed through the post-intake-valve-closure injection (step S112).

Furthermore, in this routine, subsequent to the processing at step S112, determination is made as to whether or not the air excess ratio λ is greater than 2 (step S124). If λ is determined to be greater than 2, the hydrogen-homogenized lean burn operation is continuously performed through the post-intake-valve-closure injection. The determination at step S124 continues to be executed while the post-intake-valve-closure injection operation is selected as the engine operation mode. If the determination reveals that λ is equal to or smaller than 2, the flow proceeds to step S114 where the operation mode changes from the hydrogen-homogenized lean burn operation to the plug-assisted hydrogen-diffusive combustion operation.

In accordance with the routine noted above, in the operation region where the hydrogen-homogenized lean burn operation is selected, the conversion from the hydrogen-homogenized lean burn operation to the plug-assisted hydrogen-diffusive combustion operation is executed depending on whether the actual air excess ratio λ is greater than 2. In other words, even when the engine operation belongs to the region of the intake-stroke injection operation as viewed in the map of FIG. 4, the intake-stroke injection operation is compulsorily changed to the post-intake-valve-closure injection operation if the air excess ratio λ cannot be kept greater than 2. This makes it possible to constantly maintain the air excess ratio λ greater than 2 during the course of the hydrogen-homogenized lean burn operation.

Further, in the routine noted above, even when the engine operation belongs to the region of the post-intake-valve-closure injection operation as viewed in the map of FIG. 4, the post-intake-valve-closure injection operation is compulsorily changed to the plug-assisted hydrogen-diffusive combustion operation if the air excess ratio λ cannot be kept greater than 2 by the conversion to the post-intake-valve-closure injection operation. This makes it possible to cope with the subtle environmental variation (e.g., the variation of atmosphere or fuel pressure), thus positively avoiding the reduction of the engine efficiency and the deterioration of the emission control, which would otherwise arise from the rapid combustion.

In this embodiment, the routine shown in FIG. 15 is executed by the ECU 70, thereby realizing a "control unit" in accordance with the fourth aspect of the present invention.

Subsequently, a fourth embodiment of the invention will be described with reference to FIG. 16.

As in the first embodiment, a gas-fueled internal combustion engine of this embodiment is a hydrogen engine that uses hydrogen as the gaseous fuel. The hydrogen engine of this embodiment has the configuration as shown in FIG. 1 or FIG. 14 and is adapted to select its operation mode based on the map illustrated in FIG. 4. The difference between this embodiment and the first embodiment resides at the routine for changing the operation modes.

Figure 16:
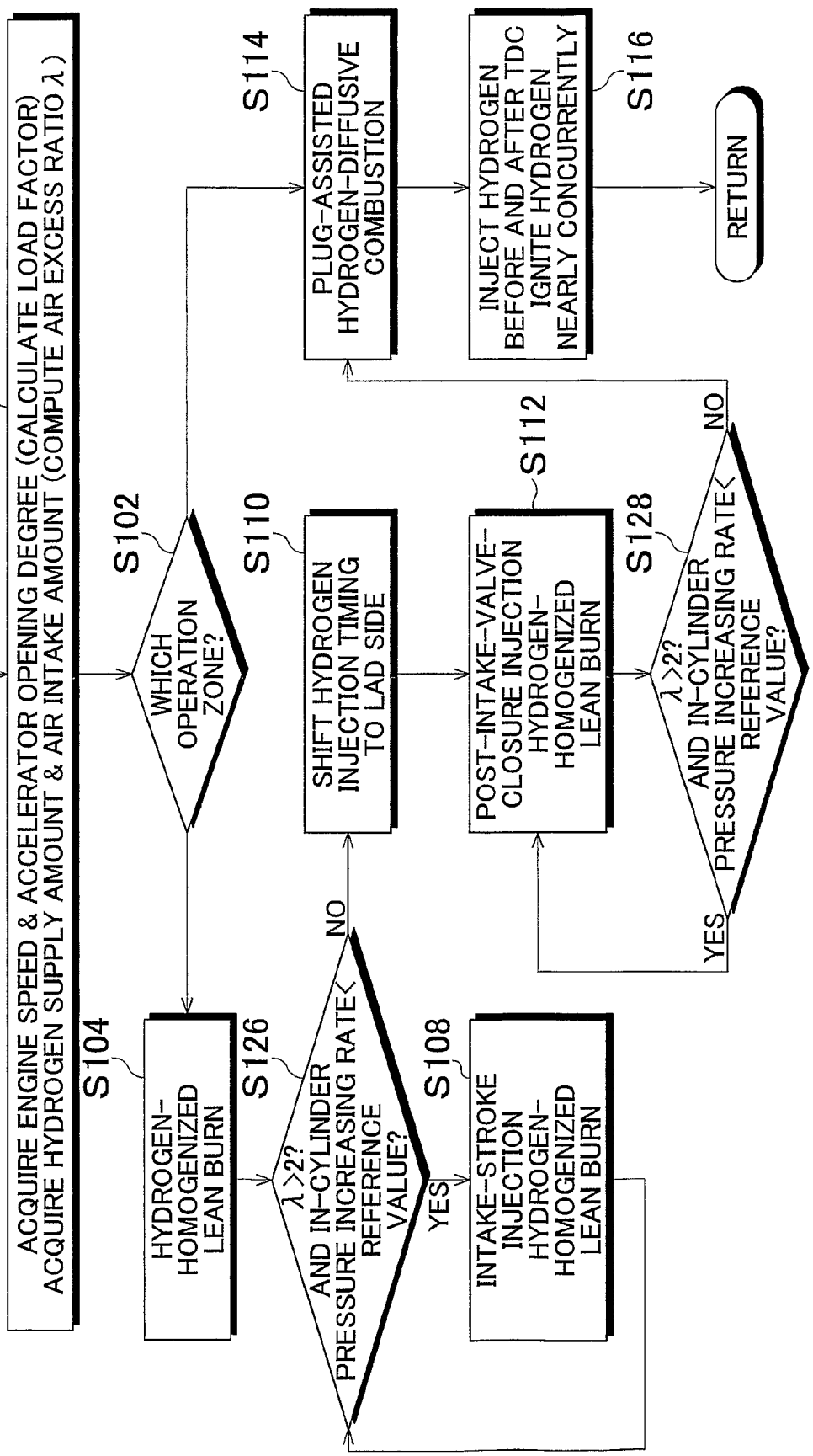
FIG. 16 is a flow chart illustrating a routine used in changing engine operation modes in a fourth embodiment of the present invention.

In this embodiment, the conversion of the engine operation modes is executed in accordance with the routine depicted in FIG. 16 wherein the same processing tasks as done in the routine of FIG. 7 or FIG. 15 are designated by like step numbers.

At step S120, which is the first step of the routine illustrated in FIG. 16, the engine speed and the accelerator opening degree are acquired as of the present time. The ECU 70 calculates the engine load (load factor) based on the engine speed and the accelerator opening degree. Also acquired at step S120 are the hydrogen supply amount and the air intake amount as of the present time. The ECU 70 calculates an air excess ratio λ based on the hydrogen supply amount and the air intake amount.

At step S102, the operation region of the map in which the current operating condition belongs is determined. If the engine is operating in the low load region or the middle load region, a hydrogen-homogenized lean burn operation is selected (step S104). On the other hand, if the engine is operating in the high load region, a plug-assisted hydrogen-diffusive combustion operation is selected (step S114).

In the event that the plug-assisted hydrogen-diffusive combustion operation is selected, the duration of hydrogen injection is set to extend over a period from a time before the compression TDC to a time after the compression TDC as depicted in FIG. 6 and the ignition plug 16 is activated substantially concurrently with the beginning of the hydrogen injection (step S116).

If the hydrogen-homogenized lean burn operation is selected as the result of determination at step S102, it is determined at step S126 whether the air excess ratio λ is greater than 2. At step S126, determination is also made as to whether the in-cylinder pressure-increase rate is below a predetermined threshold value. Depending on the operational environment or condition of the engine, there is a possibility that the combustion of hydrogen occurs rapidly and furiously even if the air excess ratio λ is greater than 2. The rapid combustion leads to a sharp increase in the in-cylinder pressure, which means that the occurrence or absence of the rapid combustion can be determined by measuring the in-cylinder pressure-increase rate. The threshold value noted above selves as a criterion for determining the occurrence or absence of the rapid combustion. A pressure sensor (not shown) provided in the combustion chamber 10 measures the in-cylinder pressure. Alternatively, if the occurrence of knock is detected by a knock sensor 76, the in-cylinder pressure-increase rate may be regarded as having exceeded the threshold value. This is because vibration such as the knock would be generated at the time of occurrence of the rapid combustion.

If the determination at step S126 reveals that the air excess ratio λ is greater than 2 and further that the in-cylinder pressure-increase rate is smaller than the threshold value, it can be determined that no rapid combustion occurs. In this case, the duration of hydrogen injection is set to have the timing as shown at the upper portion in FIG. 5 and then the hydrogen-homogenized lean burn operation is performed through the intake-stroke injection (step S108).

The determination at step S126 continues to be executed while the intake-stroke injection operation is selected as the engine operation mode. If such determination reveals that the air excess ratio λ is equal to or smaller than 2 or that the in-cylinder pressure-increase rate is equal to or greater than the threshold value, the rapid combustion is reckoned as being unavoidable under the intake-stroke injection. In this case, the hydrogen injection timing is retarded and the duration of hydrogen injection is set to have the timing as shown at the lower portion in FIG. 5 (step S110). Then the hydrogen-homogenized lean burn operation is performed through the post-intake-valve-closure injection (step S112).

Subsequent to the processing at step S112, determination is made in this routine as to whether the air excess ratio λ is greater than 2 and whether the in-cylinder pressure-increase rate is smaller than the reference value (step S128). If the air excess ratio λ is greater than 2 and the in-cylinder pressure-increase rate is smaller than the reference value, it can be determined that the rapid combustion is avoidable by virtue of the post-intake-valve-closure injection. Accordingly, in this case, the hydrogen-homogenized lean burn operation is continuously performed by the post-intake-valve-closure injection.

The determination at step S128 continues to be executed while the post-intake-valve-closure injection operation is selected as the engine operation mode. If the determination reveals that the air excess ratio $\lambda$ is equal to or smaller than 2 or that the in-cylinder pressure-increase rate is equal to or greater than the reference value, the rapid combustion is regarded as being unavoidable even under the post-intake-valve-closure injection. In this case, the flow proceeds to step S114 where the operation mode is changed from the hydrogen-homogenized lean burn operation to the plug-assisted hydrogen-diffusive combustion operation.

In accordance with the routine of this embodiment as noted above, in the operation region where the hydrogen-homogenized lean burn operation is selected, the conversion from the intake-stroke injection to the post-intake-valve-closure injection is executed depending on whether the actual air excess ratio $\lambda$ is greater than 2 and whether the in-cylinder pressure-increase rate is smaller than the threshold value. In other words, even when the engine operation belongs to the region of the intake-stroke injection operation as viewed in the map of FIG. 4, the intake-stroke injection operation is compulsorily changed to the post-intake-valve-closure injection operation if the air excess ratio $\lambda$ cannot be kept greater than 2. Furthermore, even when the air excess ratio $\lambda$ is greater than 2, the intake-stroke injection operation is compulsorily changed to the post-intake-valve-closure injection operation if the in-cylinder pressure-increase rate becomes equal to or greater than the reference value. This makes it possible to positively avoid the occurrence of the rapid combustion.

In accordance with the routine of this embodiment as described above, even when the engine operation belongs to the region of the post-intake-valve-closure injection operation as viewed in the map of FIG. 4, the post-intake-valve-closure injection operation is compulsorily changed to the plug-assisted hydrogen-diffusive combustion operation if the air excess ratio $\lambda$ cannot be kept greater than 2 by the conversion to the post-intake-valve-closure injection operation or if the in-cylinder pressure-increase rate becomes equal to or greater than the threshold value even at the air excess ratio $\lambda$ of greater than 2. This makes it possible to cope with the subtle environmental variation (e.g., the variation of atmosphere or fuel pressure), thus positively avoiding the reduction of engine efficiency and the deterioration of emission control, which would otherwise arise from the rapid combustion.

In this embodiment, the routine shown in FIG. 16 is executed by the ECU 70, thereby realizing a "control unit" in accordance with the fifth aspect of the present invention.

Figure 17:
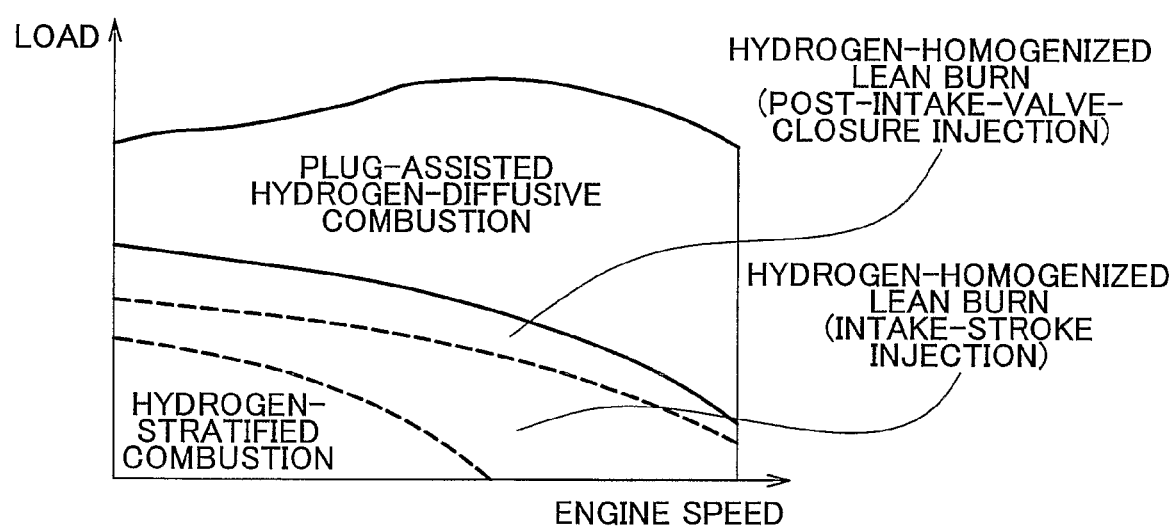
FIG. 17 illustrates a map used in selecting an engine operation mode in a fifth embodiment of the present invention.

Next, a fifth embodiment of the present invention will be described with reference to FIGS. 17 through 19.

As in the first embodiment, a gas-fueled internal combustion engine of this embodiment is a hydrogen engine that uses hydrogen as the gaseous fuel. The hydrogen engine of the fifth embodiment has the configuration as shown in FIG. 1 or FIG. 14. In accordance with the hydrogen engine illustrated in FIG. 1 or FIG. 14, hydrogen can be caused to make a stratified mixture, more particularly, a spray-guided stratified mixture, with the air, by injecting hydrogen through the actuation of the in-cylinder injection valve 40 during a compression stroke, particularly during the middle and late period of the compression stroke. Combustion of the stratified mixture, i.e., stratified combustion, can be performed at a leaner air-fuel ratio than that in the hydrogen-homogenized lean burn, thus making it possible to improve the fuel mileage. In the following, the stratified combustion of hydrogen performed at a lean air-fuel ratio will be referred to as "hydrogen-stratified lean burn".

The difference between this embodiment and the first embodiment lies in a map for selecting the engine operation modes. According to the fifth embodiment, the engine operation mode is selected based on the map illustrated in FIG. 17. This map is a multi-dimensional map whose axes represent an engine load and an engine speed. The map of FIG. 17 differs from the map of FIG. 4 in that the hydrogen-stratified lean burn is selected in place of the hydrogen-homogenized lean burn in the extremely low load region of the operation region where hydrogen is premixed and combusted at a lean air-fuel ratio. As the engine load grows heavier and the hydrogen injection quantity is increased resultantly, the duration of injection increases. This makes it difficult to physically perform the stratified combustion. Accordingly, in the operation region where the engine load is relatively high, the hydrogen-stratified lean burn operation ceases and, instead, the hydrogen-homogenized lean burn operation is selected as in the map of FIG. 4.

Figure 18:
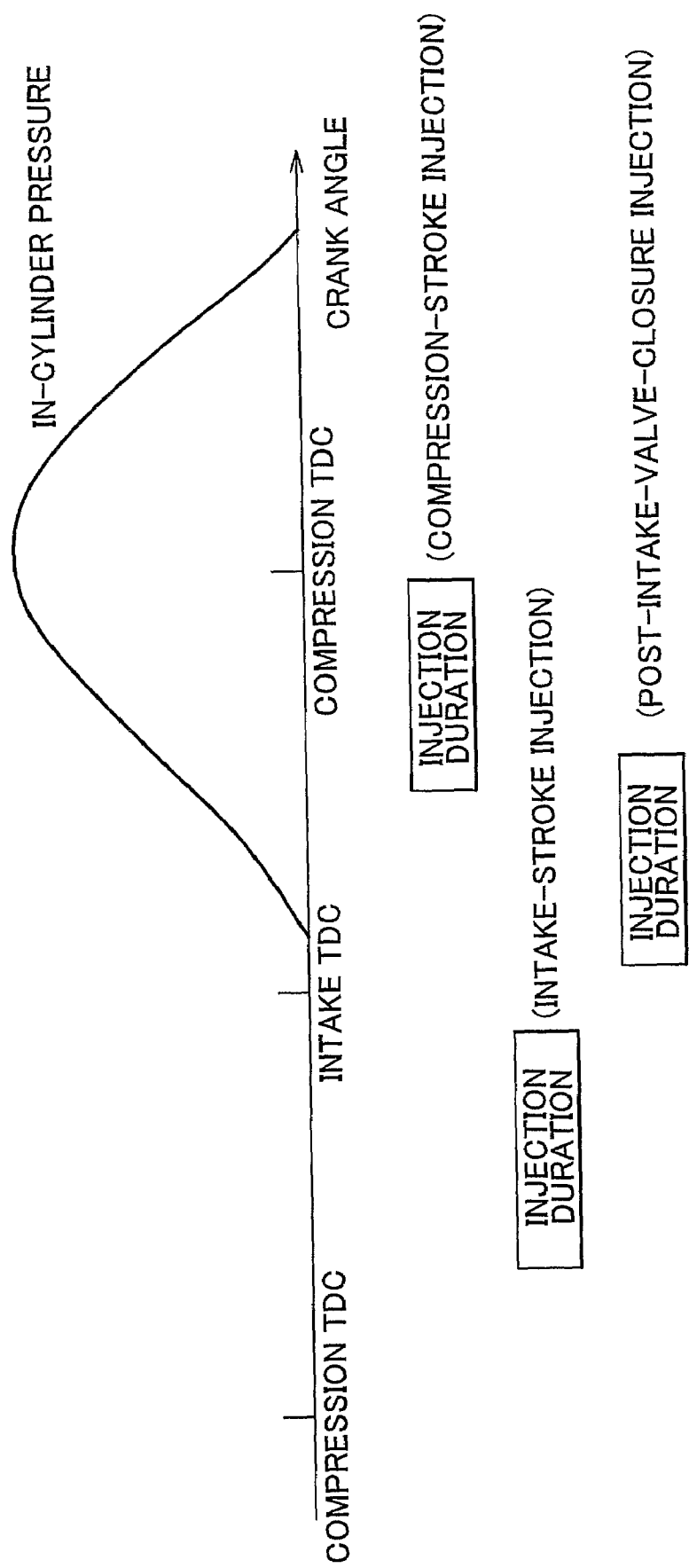
FIG. 18 is a timing diagram representing an injection timing with respect to a waveform of an in-cylinder pressure during a hydrogen lean burn operation in the fifth embodiment of the present invention.

The timing diagram of FIG. 18 concretely represents the injection timing with respect to a waveform of the in-cylinder pressure during the hydrogen-premixed combustion at a lean air-fuel ratio, i.e., the hydrogen lean burn operation (lean premix combustion operation). In FIG. 18, the term "injection duration" with a note "compression-stroke injection" in parentheses stands for the injection duration in the hydrogen-stratified lean burn, wherein the injection duration is advanced by 30-60 degrees with respect to the compression TDC. Although not shown, the ignition timing is set to be around the compression TDC, so that there is sufficient time to allow the hydrogen to make a stratified mixture with the air. The injection timing in case the hydrogen-homogenized lean burn is selected is the same as shown in the timing diagram of FIG. 5. Thus, no description will be offered in this respect.

Figure 19:
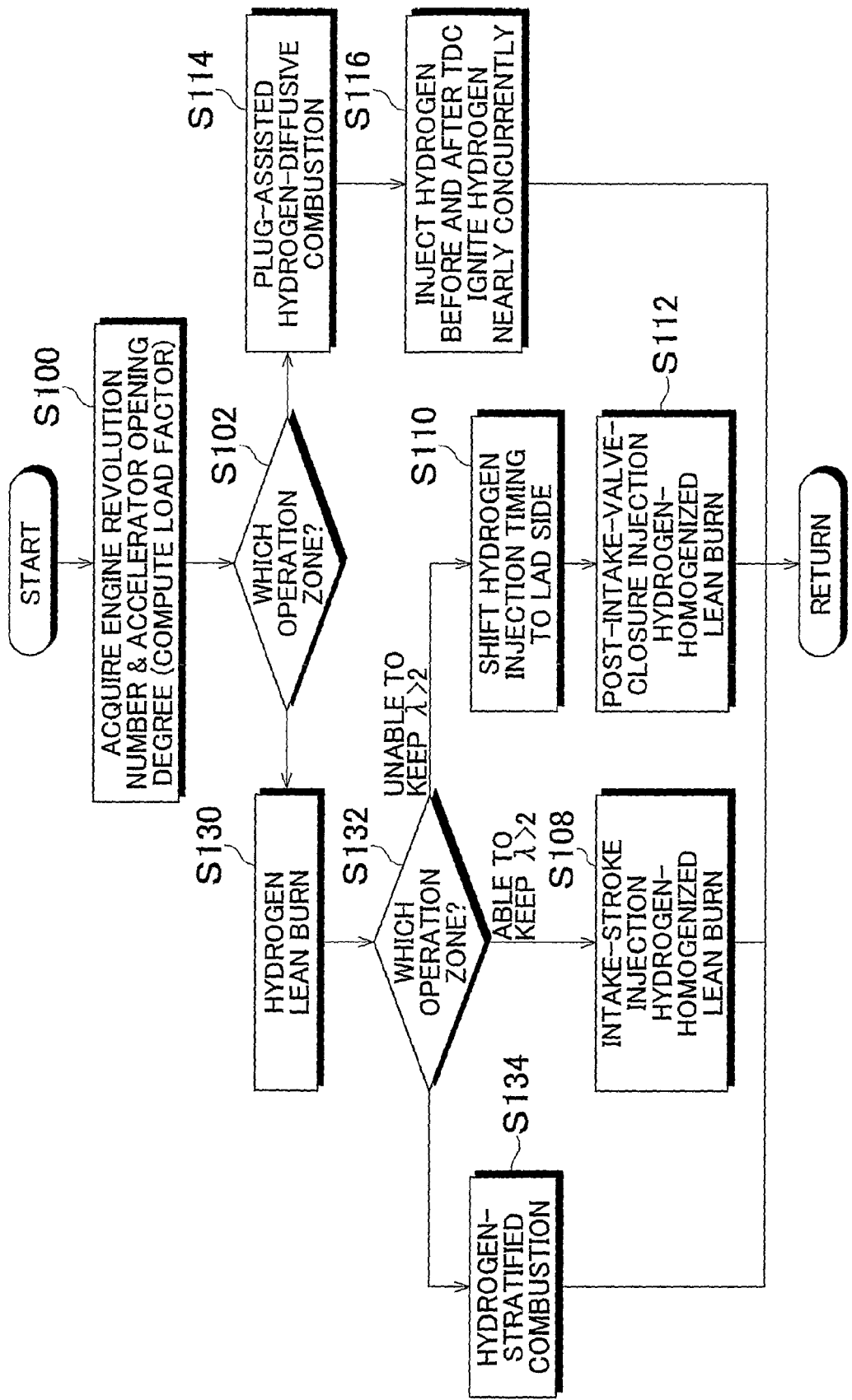
FIG. 19 is a flow chart illustrating a routine used in changing engine operation modes in the fifth embodiment of the present invention.

In this embodiment, the conversion of the engine operation modes is executed in accordance with the routine depicted in FIG. 19 wherein the same processing tasks as done in the routine of FIG. 7 are designated by like step numbers.

At step S100, which is the first step of the routine illustrated in FIG. 19, the engine speed and the accelerator opening degree are acquired as of the present time. Then, the engine load (load factor) is calculated based on the engine speed and the accelerator opening degree. At step S102, it is determined to which operation region in the map does the current operating condition belong. If the engine is operating in the low load region or the middle load region, a hydrogen lean burn operation is selected (step S130). On the other hand, if the engine is operating in the high load region, then a plug-assisted hydrogen-diffusive combustion operation is selected (step S114).

In the event that the plug-assisted hydrogen-diffusive combustion operation is selected, the duration of hydrogen injection is set to extend over a period from a time before the compression TDC to a time after the compression TDC as depicted in FIG. 6 and the ignition plug 16 is activated substantially concurrently with the beginning of the hydrogen injection (step S116).

In the case where the hydrogen lean burn operation is selected, the load region in which the engine operates is determined once again (step S132). If the engine is operating in the extremely low load region of the operation region where the hydrogen lean burn operation is selected, the duration of hydrogen injection is set to have the timing as shown at the upper portion in FIG. 18 and then the hydrogen-stratified lean burn operation is performed by the compression-stroke injection (step S134).

In the higher load region of the operation region than the extremely low load region noted above, the hydrogen-homogenized lean burn is selected rather than the hydrogen-stratified lean burn as the engine operation mode. If the engine is operating in a low load region of the operation region where the hydrogen-homogenized lean burn operation is selected, namely, in the operation region where the air excess ratio λ can be kept equal to or greater than 2 by the intake-stroke injection, the duration of hydrogen injection is set to have the timing as shown at the middle portion in FIG. 18 and then the hydrogen-homogenized lean burn operation is performed through the intake-stroke injection (step S108).

If the engine is operating in a high load region of the operation region where the hydrogen-homogenized lean burn operation is selected, namely, in the operation region where the air excess ratio λ cannot be kept equal to or greater than 2 by the intake-stroke injection, the hydrogen injection timing is retarded and the duration of hydrogen injection is set to have the timing as shown at the under-graph lower area in FIG. 18 (step S110) and then the hydrogen-homogenized lean burn operation is performed by the post-intake-valve-closure injection (step S112).

In this embodiment, the routine shown in FIG. 19 is executed by the electronic control unit 70, thereby realizing a "control unit" of the thirteenth aspect of the present invention.

Figure 20:
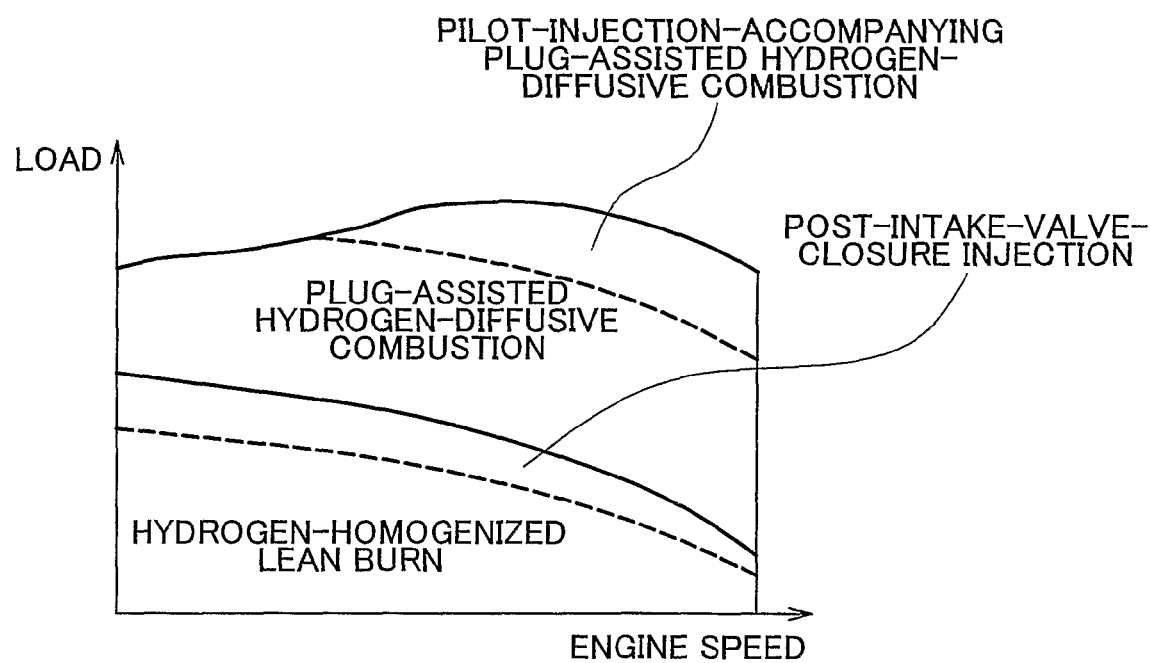
FIG. 20 illustrates a map used in selecting an engine operation mode in a sixth embodiment of the present invention.

Next, a sixth embodiment of the present invention will be described with reference to FIGS. 20 through 22.

In the plug-assisted hydrogen-diffusive combustion operation, the hydrogen injection and the ignition occur substantially at the same time and hydrogen continues to be injected toward the flame first ignited. For this reason, the combustion duration of hydrogen is made equal to, at the shortest, the period during which hydrogen is injected from the in-cylinder injection valve 40. Particularly, in the high load region, the combustion duration is noticeably prolonged in proportion to the increase of the fuel injection quantity, which acts to hinder the ideal combustion and increase the exhaust loss.

As in the first embodiment, a gas-fueled internal combustion engine of this embodiment is a hydrogen engine that uses hydrogen as the gaseous fuel. The hydrogen engine of this embodiment may have the configuration as shown in FIG. 1 or FIG. 14. In the hydrogen engine illustrated in FIG. 1 or FIG. 14, a required quantity of hydrogen can be directly injected into the combustion chamber 10 at two stages by actuating the in-cylinder injection valve 40 twice per one cycle. In this embodiment, such two-stage injection is applied to the plug-assisted hydrogen-diffusive combustion and a fraction of hydrogen is pilot-injected in advance of the main injection for diffusive combustion. This can proportionately shorten the duration of main injection, thereby avoiding any prolongation of the combustion period. In the following, the plug-assisted hydrogen-diffusive combustion that entails the pilot injection noted just above will be particularly referred to as "pilot-injection-accompanying plug-assisted hydrogen-diffusive combustion".

The difference between this embodiment and the first embodiment lies in the map for selecting the engine operation modes. In this embodiment, the engine operation modes are selected by using the map illustrated in FIG. 20. This map is a multi-dimensional map whose axes represent an engine load and an engine revolution number, respectively. The map of FIG. 20 differs from the map of FIG. 4 in that the pilot-injection-accompanying plug-assisted hydrogen-diffusive combustion is selected in the high load region of the operation region where the plug-assisted hydrogen-diffusive combustion operation is executed.

Figure 21:
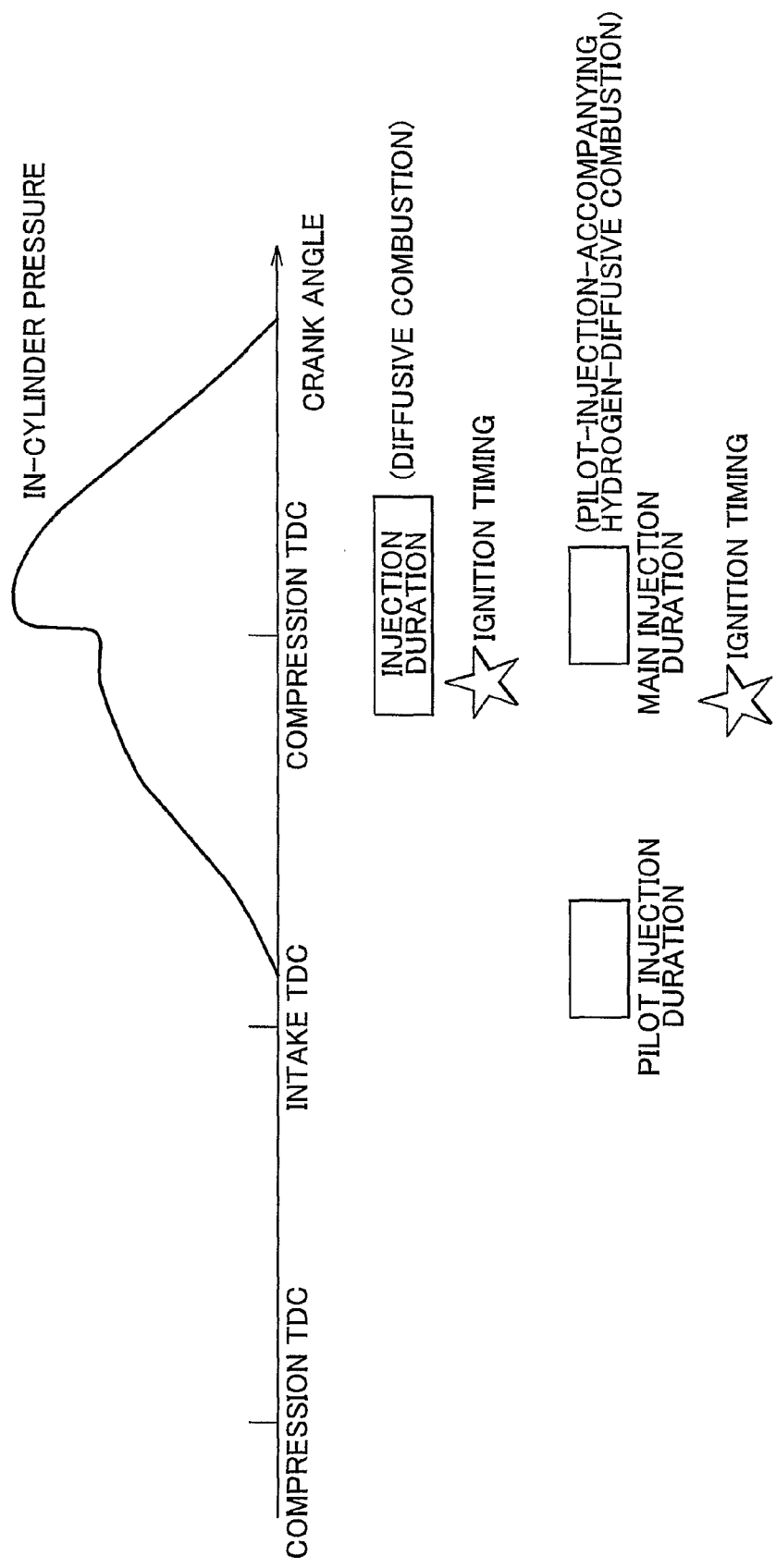
FIG. 21 is a timing diagram representing an injection timing and an ignition timing with respect to a waveform of an in-cylinder pressure during a plug-assisted hydrogen-diffusive combustion operation in the sixth embodiment of the present invention.

The timing diagram of FIG. 21 concretely represents the injection timing and the ignition timing with respect to a waveform of the in-cylinder pressure, during the pilot-injection-accompanying plug-assisted hydrogen-diffusive combustion operation. The injection timing and the ignition timing during the time when the normal plug-assisted hydrogen-diffusive combustion is selected are the same as shown in the timing diagram of FIG. 6. Thus, no description will be offered in that regard.

If the pilot-injection-accompanying plug-assisted hydrogen-diffusive combustion is selected, a part of the required injection quantity of hydrogen is first pilot-injected immediately after the intake valve 12 is closed. Pilot-injected hydrogen mixes with the air in the combustion chamber 10 to form an air-fuel mixture. In this regard, the injection quantity of hydrogen is set to keep the hydrogen concentration in the air-fuel mixture low enough to assure that the air-fuel mixture is not self-ignited at the moment when it arrives at and makes contact with the ignition plug 16. As in the normal plug-assisted hydrogen-diffusive combustion, the timing of main injection is set to extend over the compression top dead center. However, as compared to the normal plug-assisted hydrogen-diffusive combustion, the duration of main injection can be shortened by the extent that a fraction of hydrogen is pilot-injected in advance.

As in the normal plug-assisted hydrogen-diffusive combustion, the ignition timing for the pilot-injection-accompanying plug-assisted hydrogen-diffusive combustion may be set to coincide with, or be lightly retarded with respect to, the beginning of the main injection. It is preferred however that the ignition is performed in advance of the main injection as illustrated in the timing diagram of FIG. 21. Ignition of the mixture of pilot-injected hydrogen and the air starts a pilot fire that can be used in bringing about the diffusive combustion. This increases the in-cylinder temperature at the moment of main injection, thus making sure that hydrogen injected in the main injection process is ignited in a more reliable manner. This can reduce the quantity of hydrogen discharged unburned. Furthermore, if a fraction of hydrogen is burned prior to the diffusive combustion in this way, it becomes possible to suppress any excessive rise of the in-cylinder pressure during the diffusive combustion process.

Figure 22:
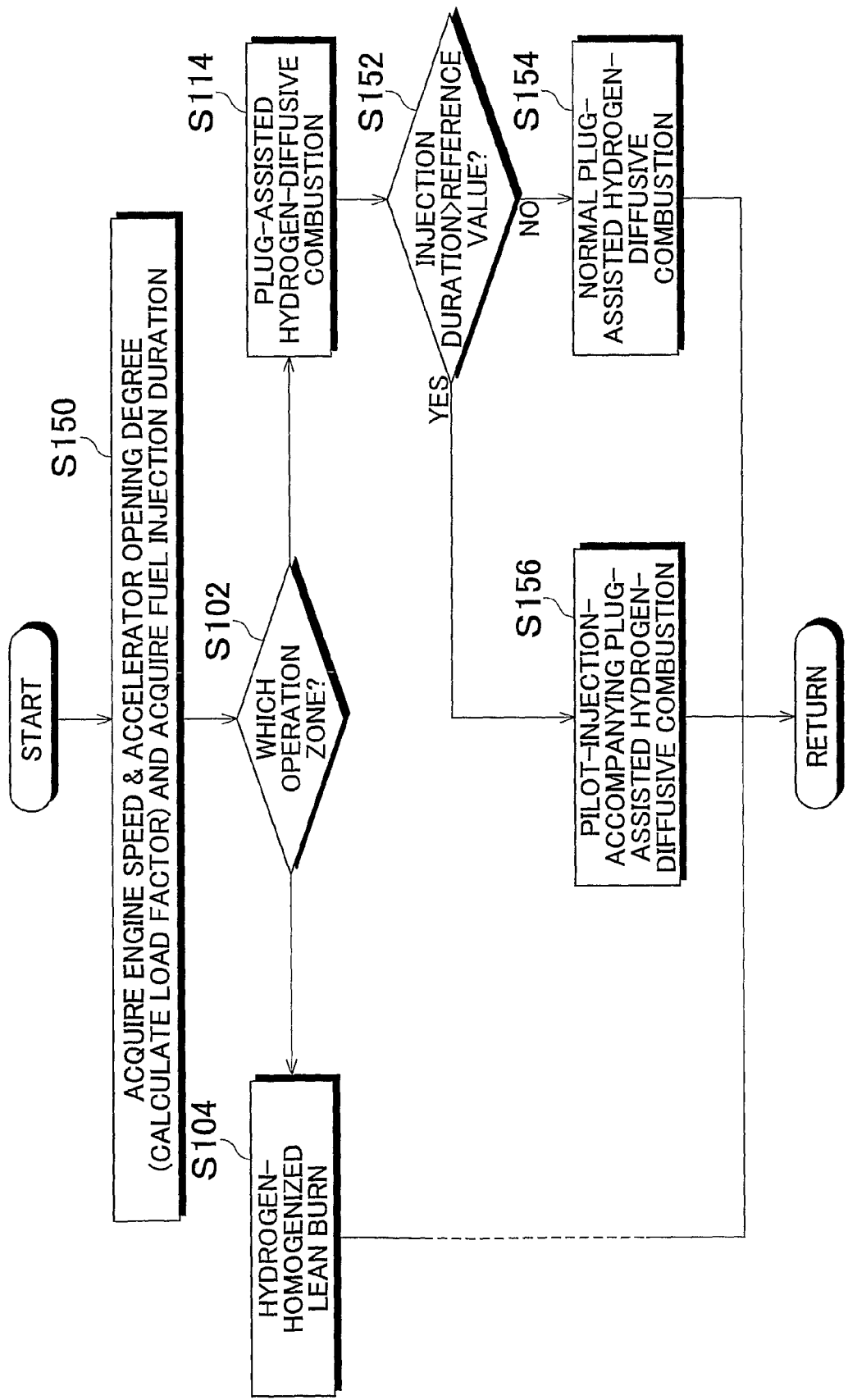
FIG. 22 is a flow chart illustrating a routine used in changing engine operation modes in the sixth embodiment of the present invention.

In this embodiment, the conversion of the engine operation modes is executed in accordance with the routine depicted in FIG. 22 wherein the same processing tasks as done in the routine of FIG. 7 are designated by like step numbers. The processing subsequent to the selection of the hydrogen-homogenized lean burn operation in FIG. 22 is completely the same as in the routine of FIG. 7. Thus, illustration is omitted for the processing subsequent to step S104. In the following, description will be omitted altogether or briefly presented regarding the processing tasks already described hereinabove.

At step S150, which is the first step of the routine illustrated in FIG. 22, the engine revolution number and the accelerator opening degree are acquired as of the present time. The engine load (load factor) is computed based on the engine revolution number and the accelerator opening degree. Also acquired at step S150 is the duration of hydrogen injection as of the present time. The duration of hydrogen injection is computed from the hydrogen supply amount and the injection pressure of the in-cylinder injection valve 40.

At step S102, it is determined to which operation region in the map does the current operating condition belong. If the engine is operating in the low load region or the middle load region, a hydrogen-homogenized lean burn operation is selected (step S104). On the other hand, if the engine is operating in the high load region, a plug-assisted hydrogen-diffusive combustion operation is selected (step S114).

In the event that the plug-assisted hydrogen-diffusive combustion operation is selected, determination is made as to whether the duration of hydrogen injection is above a predetermined threshold value (step S152). In the map of FIG. 20, the operation region where the pilot-injection-accompanying plug-assisted hydrogen-diffusive combustion is selected amounts to an operation region in which the duration of hydrogen injection becomes greater than the predetermined threshold value. On the other hand, the operation region where the normal plug-assisted hydrogen-diffusive combustion is selected amounts to an operation region in which the duration of hydrogen injection becomes equal to or below the predetermined threshold value.

If the determination made at step S152 reveals that the duration of hydrogen injection is equal to or below the predetermined threshold value, the normal plug-assisted hydrogen-diffusive combustion operation is selected. In this case, the duration of hydrogen injection is set to extend over a time period from a time before the compression dead center to a time after the compression top dead center as depicted at the under-graph upper area in FIG. 21 and the ignition plug 16 is activated substantially concurrently with the beginning of the hydrogen injection (step S154).

Meanwhile, If the duration of hydrogen injection is determined to be above the predetermined threshold value, the pilot-injection-accompanying plug-assisted hydrogen-diffusive combustion operation is selected. In this case, as depicted at the under-graph lower area in FIG. 21, the duration of pilot injection is set to start just after the closure of the intake valve 12 and the duration of main injection is set to extend over a period from a time before the compression dead center to a time after the compression top dead center. Further, the ignition plug 16 is activated in advance of the beginning of the main injection (step S156).

In this embodiment, the routine shown in FIG. 22 is executed by the electronic control unit 70, thereby realizing a "control unit" of the sixth and seventh aspect of the present invention.

Next, a seventh embodiment of the invention will be described with reference to FIGS. 23 through 25.

As in the first embodiment, a gas-fueled internal combustion engine of this embodiment is a hydrogen engine that uses hydrogen as the gaseous fuel. The hydrogen engine of this embodiment may have the configuration as shown in FIG. 1 or FIG. 14 and is adapted to select its operation mode by using the map illustrated in FIG. 4. The difference between this embodiment and the first embodiment resides at the ignition operation of the ignition plug 16 during the course of the plug-assisted hydrogen-diffusive combustion operation.

Figure 23:
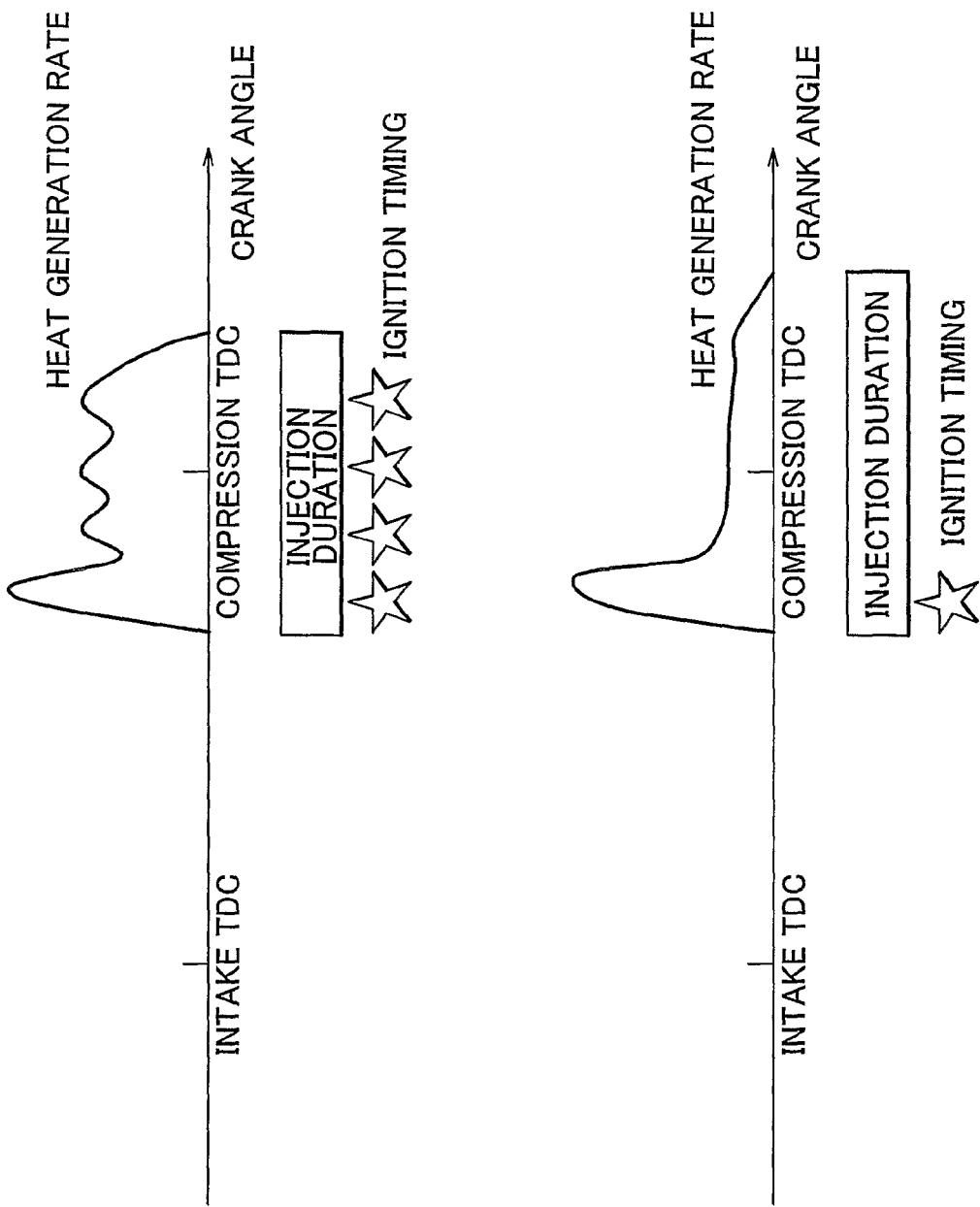
FIG. 23 are timing diagrams representing an injection timing and an ignition timing with respect to a waveform of a heat generation rate during a plug-assisted hydrogen-diffusive combustion operation, wherein the upper diagram shows an injection timing and an ignition timing in a seventh embodiment of the present invention and the lower diagram depicts the same injection timing and ignition timing as in the first embodiment.

The timing diagrams of FIG. 23 concretely represent the injection timing and the ignition timing with respect to a waveform of the heat generation rate, during the plug-assisted hydrogen-diffusive combustion operation. The lower diagram in FIG. 23 shows the same injection timing and ignition timing as adopted in the first embodiment. If the injection timing and the ignition timing are set as in the lower diagram in FIG. 23, a flame is started upon ignition of the injected hydrogen stream by the ignition plug 16 and hydrogen continues to be injected toward the flame. In this process, the fraction of hydrogen that has failed to penetrate into the flame is discharged unburned. Since the state of the flame is not always uniform in the hydrogen injection process, a large quantity of unburned hydrogen may be produced depending on the circumstances. The quantity of unburned hydrogen tends to increase as the hydrogen injection quantity increases, namely, as the duration of hydrogen injection becomes longer. Accordingly, in keeping with the prolongation of hydrogen injection duration, it may be necessary to inject a little bit more hydrogen to compensate the anticipated loss of hydrogen due to the unburned discharge thereof.

The upper diagram in FIG. 23 shows the injection timing and the ignition timing adopted in this embodiment. In this embodiment, the ignition plug 16 is activated plural times (four times in FIG. 23) within the duration of hydrogen injection to ignite the injected hydrogen stream. The first ignition is to form a core flame in the diffusive combustion, while the second and subsequent ignitions are supplementary ignitions. Such execution of the supplementary ignitions in the duration of hydrogen injection allows hydrogen to be burned more thoroughly, thereby reducing the quantity of hydrogen discharged unburned. The duration of hydrogen injection can be shortened in proportion to the reduction in the quantity of unburned hydrogen. Moreover, as can be seen from the waveform of the heat generation rate, heat is generated more intensively every ignition time than in the normal plug-assisted hydrogen-diffusive combustion. This helps to shorten the overall time period of heat generation, which makes it possible to realize torque-increasing combustion.

Figure 24:
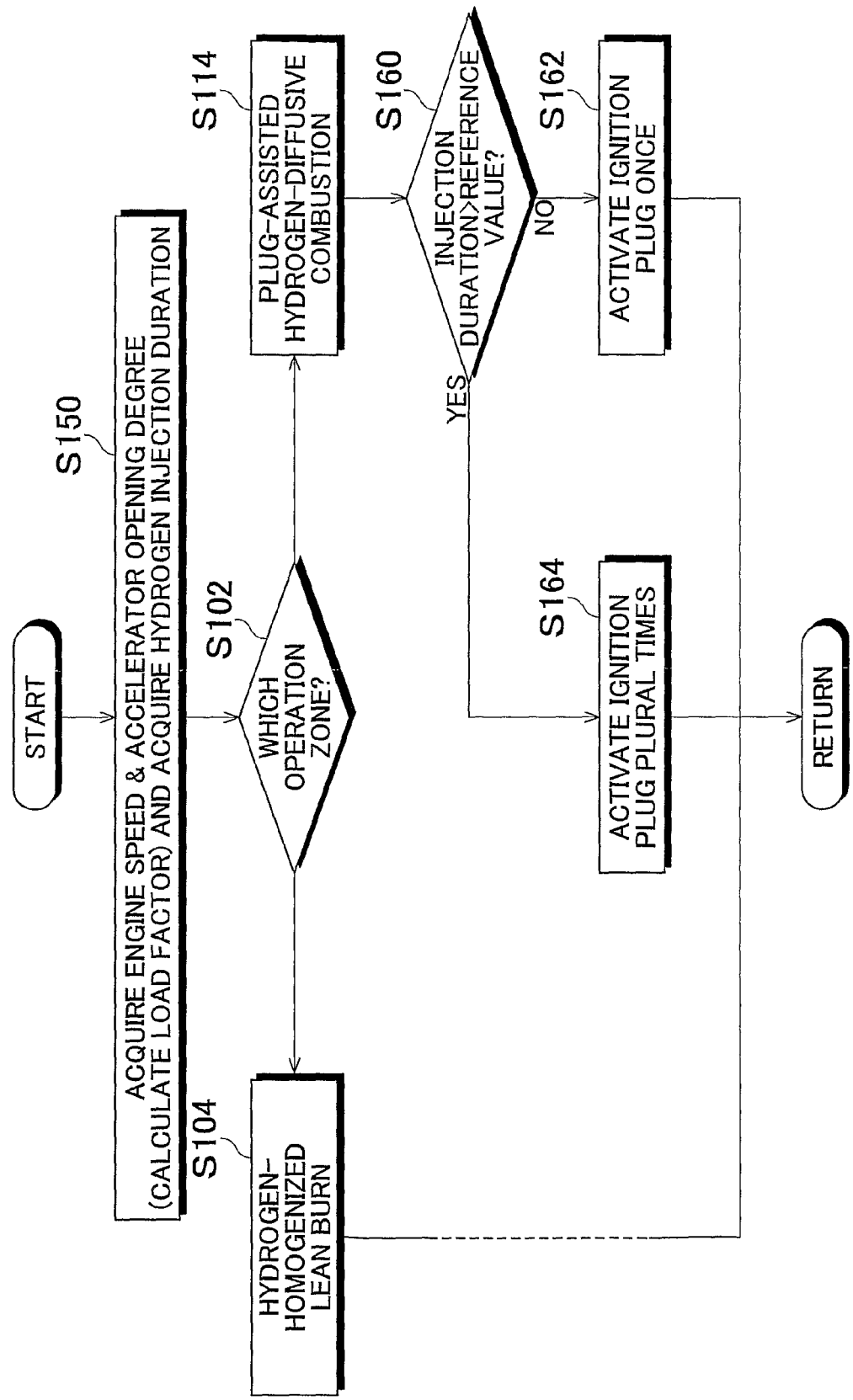
FIG. 24 is a flow chart illustrating a routine used in changing engine operation modes in the seventh embodiment of the present invention.

In this embodiment, the conversion of the engine operation modes is executed in accordance with the routine depicted in FIG. 24 wherein the same processing tasks as done in the routine of FIG. 7 are designated with like step numbers. The processing subsequent to the selection of the hydrogen-homogenized lean burn operation in FIG. 24 is identical to the routine of FIG. 7. Thus, illustration is omitted for the processing subsequent to step S104. In the following, description will be omitted altogether or briefly presented regarding the processing tasks already described hereinabove.

At step S150, which is the first step of the routine illustrated in FIG. 24, the engine revolution number, the accelerator opening degree and the hydrogen injection duration are acquired as of the present time. An engine load (load factor) is computed based on the engine revolution number and the accelerator opening degree.

At step S102, it is determined to which operation region in the map does the current operating condition belong. If the engine is operating in the low load region or the middle load region, a hydrogen-homogenized lean burn operation is selected (step S104). On the other hand, if the engine is operating in the high load region, a plug-assisted hydrogen-diffusive combustion operation is selected (step S114).

In the event that the plug-assisted hydrogen-diffusive combustion operation has been selected, determination is made as to whether the duration of hydrogen injection is above a predetermined threshold value (step S160). If the hydrogen injection duration is determined to be equal to or smaller than the threshold value, the ignition plug 16 is activated only once to perform the first ignition at the timing shown in the lower diagram of FIG. 23 (step S162). If, however, the hydrogen injection duration is determined to be greater than the threshold value, the ignition plug 16 is activated plural times at the timings shown in the upper diagram of FIG. 23 (step S164), in which case the frequency of ignition plug activation may be arbitrarily set.

In the routine noted above, during the time when the hydrogen injection duration is short and hence unburned hydrogen is produced in a small quantity, the ignition is performed only once, which makes it possible to save the energy consumed in the ignition operation. If the hydrogen injection duration grows longer, the ignition plug 16 is activated more times. This allows hydrogen to be burned more thoroughly, thereby reducing the quantity of hydrogen discharged unburned.

Furthermore, the activation frequency of the ignition plug 16 in the hydrogen injection process can be increased step-by-step depending on the hydrogen injection duration. In place of the afore-mentioned routine, the conversion of engine operation modes may be conducted by using, for example, the routine illustrated in FIG. 25 wherein the same processing tasks as done in the routine of FIG. 24 are designated with like step numbers.

Figure 25:
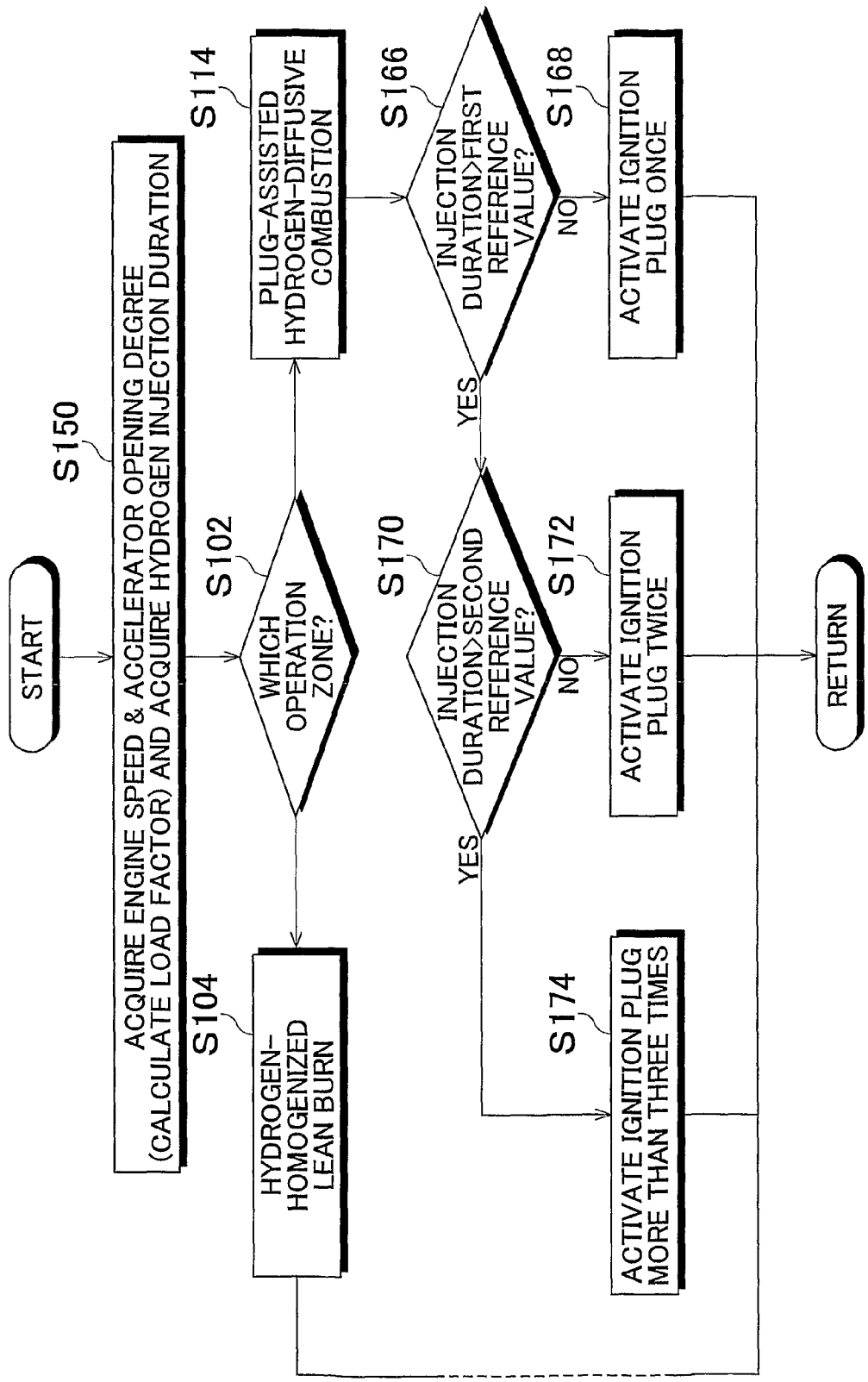
FIG. 25 is a flow chart illustrating another example of a routine used in changing engine operation modes in the seventh embodiment of the present invention.

In the routine illustrated in FIG. 25, a first reference value and a second reference value are prepared for the determination of length of the hydrogen injection duration. The second reference value is set to have a magnitude greater than the first reference value. In the event that the plug-assisted hydrogen-diffusive combustion operation has been selected as the result of load region determination at step S102, it is determined whether the hydrogen injection duration is greater than the first threshold value (step S166). If the hydrogen injection duration is determined to be equal to or smaller than the first threshold value, the ignition plug 16 is activated only once to perform the first ignition (step S168). If, however, the hydrogen injection duration is determined to be greater than the first threshold value, then determination is made as to whether the hydrogen injection duration is greater than the second threshold value (step S170). If the hydrogen injection duration is determined to be equal to or smaller than the second threshold value, the ignition plug 16 is activated twice (step S172). If the hydrogen injection duration is determined to exceed the second threshold value, the ignition plug 16 is activated more than three times (step S174).

Increasing the ignition plug activation frequency in proportion to the hydrogen injection duration in this fashion helps to further save the energy used in the ignition process and assures a reliable ignition of hydrogen.

In this embodiment, the routine shown in FIG. 24 or FIG. 25 is executed by the electronic control unit 70, thereby realizing a "control unit" of the eighth aspect of the present invention.

Next, an eighth embodiment of the present invention will be described with reference to FIGS. 26 through 29.

Figure 26:
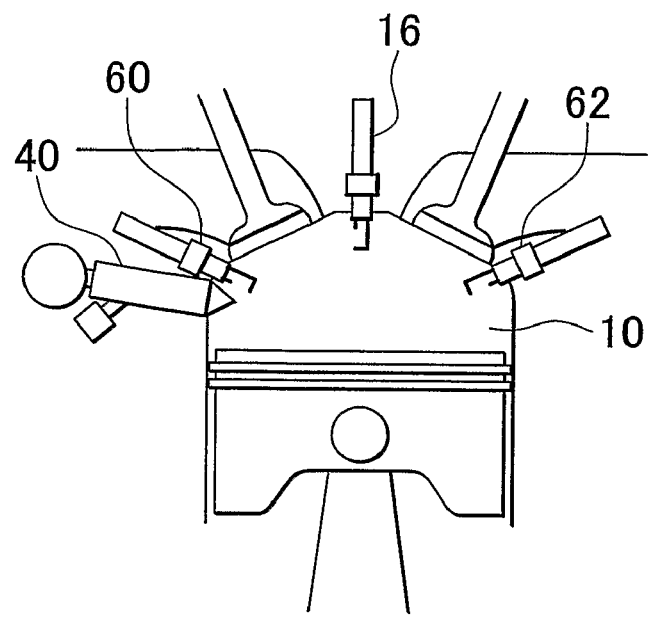
FIG. 26 is an enlarged side elevational view illustrating the surrounding configuration of a combustion chamber in a hydrogen engine in accordance with an eighth embodiment of the present invention.
Figure 27:
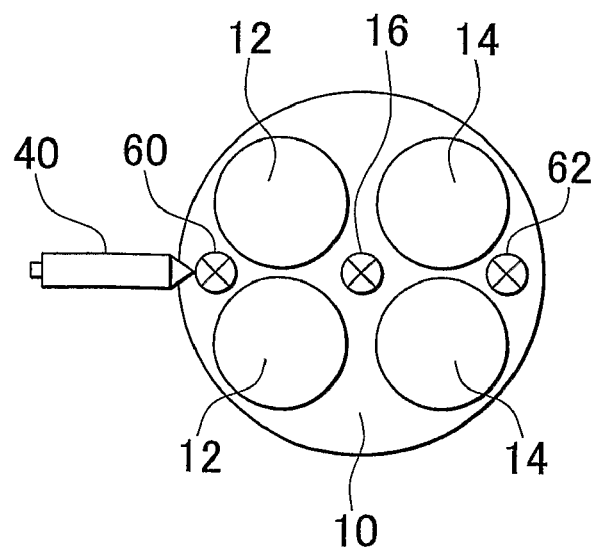
FIG. 27 is an enlarged top view illustrating the surrounding configuration of a combustion chamber in the hydrogen engine in accordance with the eighth embodiment of the present invention.

As in the first embodiment, a gas-fueled internal combustion engine of this embodiment is a hydrogen engine that uses hydrogen as the gaseous fuel. The hydrogen engine of this embodiment may be realized by replacing the surrounding configuration of the combustion chamber 10 in the hydrogen engine shown in FIG. 1 or FIG. 14 with the configuration depicted in FIGS. 26 and 27. FIG. 26 shows the combustion chamber 10 as viewed from the side and FIG. 27 illustrates the combustion chamber 10 as viewed from the top. In FIGS. 26 and 27, the same parts as those of the hydrogen engine illustrated in FIG. 1 or FIG. 14 are designated with like reference numerals.

As shown in FIGS. 26 and 27, the hydrogen engine of this embodiment is provided with three, i.e., first to third, ignition plugs 16, 60 and 62. Just like in the first embodiment, the first ignition plug 16 is disposed on the apex of the combustion chamber 10. The in-cylinder injection valve 40 is disposed on the side wall portion of the combustion chamber 10 in such a manner that the injection hole thereof is oriented to inject hydrogen toward the first ignition plug 16. The second ignition plug 60 is disposed just above the in-cylinder injection valve 40 and the third ignition plug 62 is disposed on a diametrically opposite side from the in-cylinder injection valve 40. As best illustrated in FIG. 27, the in-cylinder injection valve 40 and the three ignition plugs 16, 60 and 62 are arranged on a common rectilinear line such that the hydrogen stream injected from the in-cylinder injection valve 40 can move past the second ignition plug 60, the first ignition plug 16 and the third ignition plug 62 in the named sequence. Like the first ignition plug 16, activation of the second ignition plug 60 and the third ignition plug 62 is controlled by means of the electronic control unit 70.

In the configuration shown in FIGS. 26 and 27, the three ignition plugs 60, 16 and 62 are arranged along the path of the injected hydrogen stream. This makes it possible to ignite the injected hydrogen stream at three points, i.e., at upstream, midstream and downstream points of the injected hydrogen stream, during the course of the plug-assisted hydrogen-diffusive combustion operation. Concrete ignition operation of the ignition plugs 60, 16 and 62 during the time of performing the plug-assisted hydrogen-diffusive combustion operation will be described below with reference to FIGS. 28A, 28B and 28C.

Figure 28A:
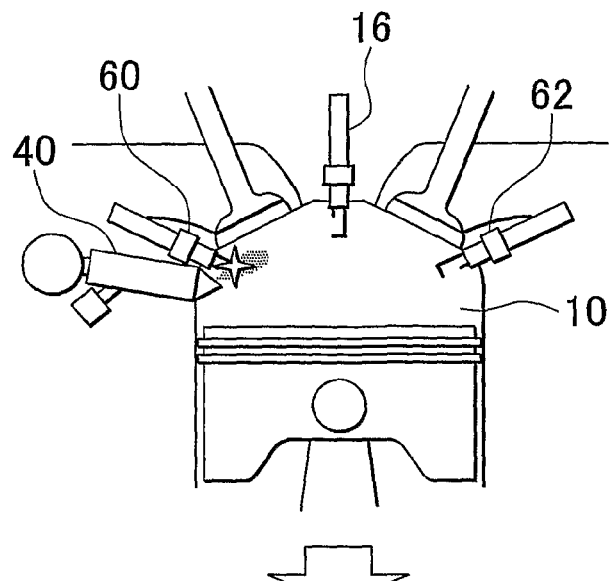
FIGS. 28A, 28B and 28C are views for explaining a concrete ignition operation performed during a plug-assisted hydrogen-diffusive combustion operation in the eighth embodiment of the present invention.
Figure 28B:
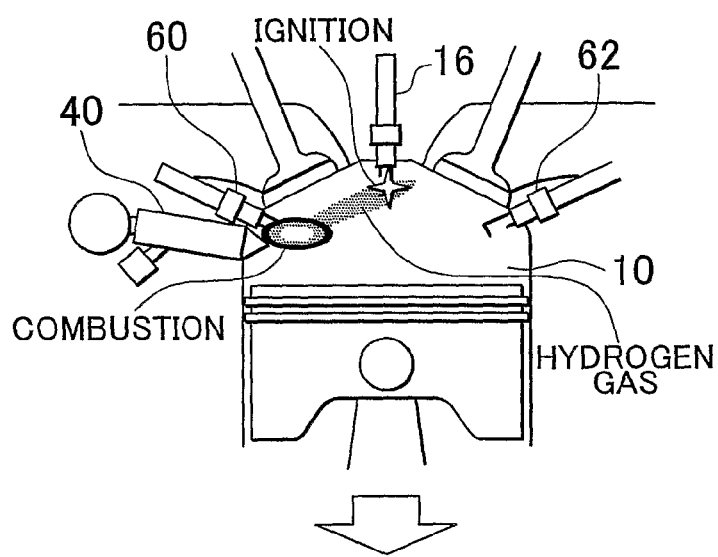
Figure 28C:
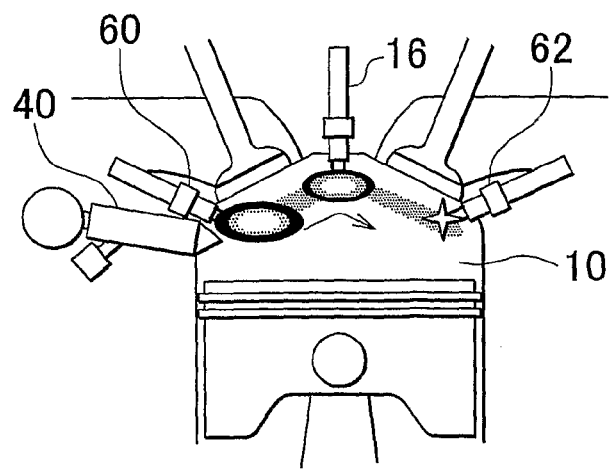

Referring to FIG. 28A, the second ignition plug 60 neighboring the in-cylinder injection valve 40 is first activated substantially concurrently with the injection of hydrogen from the in-cylinder injection valve 40. The injected hydrogen stream is ignited by such ignition plug activation and therefore diffusive combustion occurs around the second ignition plug 60 as illustrated in FIG. 28B. At this time, however, a fraction of hydrogen often remains unburned and forms an unburned hydrogen stream moving toward the downstream side. In view of such situation, as depicted in FIG. 28B, the first ignition plug 16 is activated coincidentally with the timing when the injected hydrogen stream reaches the first ignition plug 16 located centrally. The unburned hydrogen is ignited by the activation of the first ignition plug 16 and therefore diffusive combustion occurs around the first ignition plug 16 as illustrated in FIG. 28B. Even after this ignition process, a fraction of hydrogen is often left unburned and thus moves toward the downstream side as an unburned hydrogen stream. Taking this into account, as depicted in FIG. 28C, the third ignition plug 62 is activated coincidentally with the timing when the injected hydrogen stream reaches the third ignition plug 62 arranged at the location furthest downstream.

Such sequential activation of the three ignition plugs 60, 16 and 62 with a phase difference left therebetween assures a more reliable ignition of hydrogen, whereby the initially appearing flame can be built up in a convincing way and the subsequent diffusive combustion can be sustained without fail. This makes it possible to reduce the quantity of hydrogen discharged unburned during the plug-assisted hydrogen-diffusive combustion operation.

The unburned hydrogen is produced mostly when the engine load is high and hydrogen is injected in a large quantity. Therefore, unlike the above-noted instance where the three ignition plugs 60, 16 and 62 are activated in their entirety, activating only the ignition plug 60 located near the in-cylinder injection valve 40 and the centrally arranged ignition plug 16 in the named sequence is considered to be sufficient for the combustion, if the engine load is low and if hydrogen is injected in a relatively small quantity. It is also considered that, if the hydrogen injection quantity is small, activating merely the ignition plug 60 located near the in-cylinder injection valve 40 will suffice for the combustion. In order to avoid unnecessary ignition operation and thus save energy while reliably suppressing the production of unburned hydrogen, it is desirable to change the number of ignition point depending on the engine load as set forth above.

In this embodiment, the conversion of the engine operation modes is executed in accordance with the routine depicted in FIG. 29 wherein the same processing tasks as done in the routine of FIG. 7 are designated with like step numbers. The processing subsequent to the selection of the hydrogen-homogenized lean burn operation in FIG. 29 is completely the same as in the routine of FIG. 7. Thus, illustration is omitted for the processing subsequent to step S104. In the following, description will be omitted altogether or briefly presented regarding the processing tasks already described hereinabove.

At step S100, which is the first step of the routine illustrated in FIG. 29, an engine revolution number and an accelerator opening degree are acquired as of the present time. An engine load (load factor) is computed based on the engine revolution number and the accelerator opening degree.

At step S102, it is determined to which operation region in the map does the current operating condition belong. If the engine is operating in the low load region or the middle load region, a hydrogen-homogenized lean burn operation is selected (step S104). On the other hand, if the engine is operating in the high load region, a plug-assisted hydrogen-diffusive combustion operation is selected (step S114).

In the event that the plug-assisted hydrogen-diffusive combustion operation has been selected, the optimal number of ignition points is computed from the engine load (load factor) at step S180. More specifically, as the engine load increases, the number of ignition points are increased from one, the first ignition by the second ignition plug 60, to two, by adding the second ignition by the first ignition plug 16, and further to three, by further adding the third ignition by the third ignition plug 62 in the stated sequence.

At step S182, hydrogen is injected before and after the compression top dead center and, at the same time, the ignition plug activation is executed in correspondence to the optimal number of ignition point. At this time, in case of plural number activation of the ignition plugs, they are sequentially activated with a phase difference left therebetween from the upstream side to the downstream side of the injected hydrogen stream.

Although omitted in the routine of FIG. 29, the centrally arranged ignition plug 16 is employed at the time of hydrogen-homogenized lean burn operation, as in the first embodiment. All of the ignition plugs 16, 60 and 62 may be activated in an effort to sustain super-lean burn.

The first ignition plug 16 is also used when the hydrogen-stratified lean burn operation is selected at the extremely low load, as in the fifth embodiment. Alternatively, with a view to secure an increased mixing time of hydrogen and the air, the third ignition plug 62 located farthest from the in-cylinder injection valve 40 may be activated in place of the first ignition plug 16.

In this embodiment, the routine shown in FIG. 29 is executed by the electronic control unit 70 of the hydrogen engines shown in FIGS. 26 and 27, thereby realizing a "control unit" of the ninth aspect of the present invention.

Next, a ninth embodiment of the present invention will be described with reference to FIG. 30.

As in the first embodiment, a gas-fueled internal combustion engine of this embodiment is a hydrogen engine that uses hydrogen as the gaseous fuel. The hydrogen engine of this embodiment is realized by replacing the surrounding configuration of the combustion chamber 10 in the hydrogen engine shown in FIG. 1 or FIG. 14 with the configuration depicted in FIG. 30. FIG. 30 shows the combustion chamber 10 as viewed from the top. In FIG. 30, the same parts as those of the hydrogen engine illustrated in FIG. 1 or FIG. 14 are designated with like reference numerals.

Figure 30:
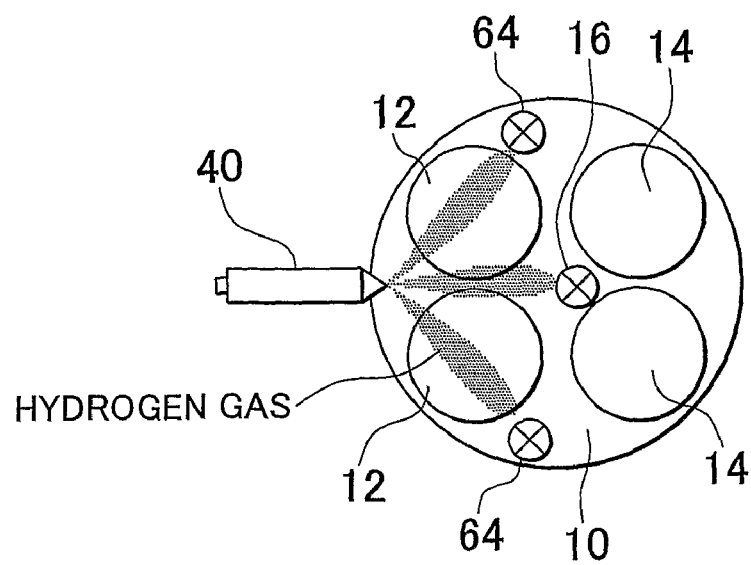
FIG. 30 is an enlarged view illustrating the surrounding configuration of a combustion chamber in a hydrogen engine in accordance with a ninth embodiment of the present invention.

As illustrated in FIG. 30, the hydrogen engine of this embodiment includes an in-cylinder injection valve 40 arranged on the side wall portion of the combustion chamber 10. In addition to the ignition plug 16 disposed on the apex of the combustion chamber 10, two ignition plugs 64 and 64 are provided on the top flank sides of the combustion chamber 10 in such a manner that the ignition plug 16 lies therebetween. The three ignition plugs 16, 64 and 64 are arranged substantially at an equal distance from the tip end of the in-cylinder injection valve 40. The in-cylinder injection valve 40 has three injection holes through which hydrogen is simultaneously injected toward the respective ignition plugs 16, 64 and 64. Just like the ignition plug 16, activation of the ignition plugs 64 and 64 is controlled by means of the electronic control unit 70.

In the configuration shown in FIG. 30, a required quantity of hydrogen can be dividedly injected in three directions during the plug-assisted hydrogen-diffusive combustion operation such that diffusive combustion can occur at three points within the combustion chamber 10. This reduces the hydrogen injection quantity allotted to each ignition plug, thereby assuring the positive combustion of hydrogen and decreasing the emission of unburned hydrogen. Because the respective ignition plugs 16, 64 and 64 are positioned at an equal distance from the in-cylinder injection valve 40, the injected hydrogen streams are nearly simultaneously ignited. Furthermore, injecting the same quantity of hydrogen in the respective directions can substantially equalize the heat generation amount at each combustion points. This assures uniform combustion with reduced fluctuation.

Next, a tenth embodiment of the present invention will be described with reference to FIG. 31.

As in the first embodiment, a gas-fueled internal combustion engine of this embodiment is a hydrogen engine that uses hydrogen as the gaseous fuel. In the hydrogen engine according to this embodiment the surrounding configuration of the combustion chamber 10 in the hydrogen engine shown in FIG. 1 or FIG. 14 is replaced with the configuration depicted in FIG. 31. FIG. 31 shows the combustion chamber 10 as viewed from the top. In FIG. 31, the same parts as those of the hydrogen engine illustrated in FIG. 1 or FIG. 14 are designated with like reference numerals.

Figure 31:
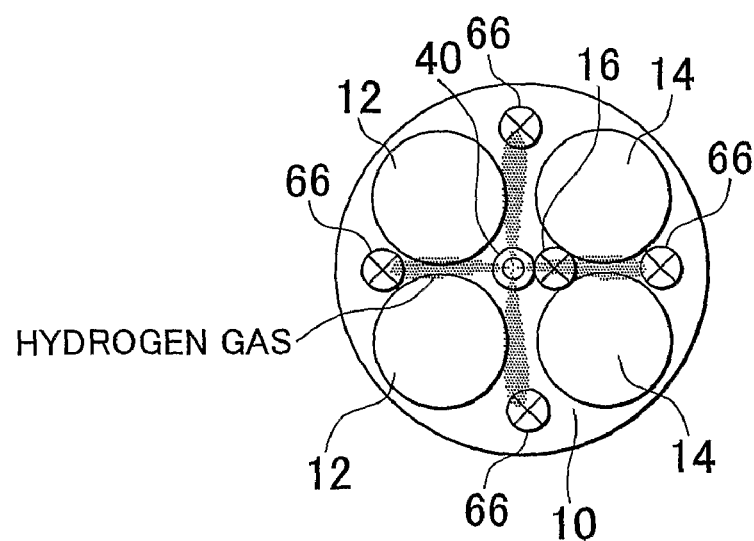
FIG. 31 is an enlarged view illustrating the surrounding configuration of a combustion chamber in a hydrogen engine in accordance with a tenth embodiment of the present invention.

As depicted in FIG. 31, the hydrogen engine of this embodiment includes an in-cylinder injection valve 40 and an ignition plug 16 arranged on the apex portion of the combustion chamber 10, as in the configuration of FIG. 3, which is a modification of the first embodiment. The in-cylinder injection valve 40 is disposed at the center of apex portion of the combustion chamber 10, while the ignition plug 16 is positioned immediately next to the in-cylinder injection valve 40 in an offset relationship. In addition, four ignition plugs 66 are arranged on top flank sides of the combustion chamber 10 at an equal interval along an imaginary circle whose center coincides with the center axis of the in-cylinder injection valve 40. One of the ignition plugs 66 is located on a rectilinear line extending from the in-cylinder injection valve 40 through the ignition plug 16. The in-cylinder injection valve 40 has four injection holes through which hydrogen is injected radially outward, toward the four ignition plugs 66. Just like the ignition plug 16, activation of the ignition plugs 66 is controlled by means of the electronic control unit 70.

In the configuration shown in FIG. 31 wherein the ignition plug 16 is located immediately next to the in-cylinder injection valve 40, a flame can be formed just near the in-cylinder injection valve 40 at the time of the plug-assisted hydrogen-diffusive combustion operation by activating the ignition plug 16 substantially concurrently with the injection of hydrogen. Moreover, due to the fact that the ignition plugs 66 are arranged in alignment with the hydrogen injection directions, it becomes possible to positively ignite the fraction of hydrogen that was not diffusion-combusted by the central flame. Additionally, inasmuch as hydrogen is dispersedly injected toward the ignition plugs 66, it is possible to assure the positive combustion of hydrogen and decrease the emission of unburned hydrogen.

Furthermore, in the configuration shown in FIG. 31, hydrogen is dispersedly injected radially downward from the in-cylinder injection valve 40 arranged on the apex portion of the combustion chamber 10. This allows hydrogen to be homogeneously mixed with the air during the time of the hydrogen-homogenized lean burn operation.

While the invention has been shown and described with respect to the embodiments, it will be understood by those skilled in the art that various changes and modification may be made without departing from the spirit and scope of the invention as defined in the claims. For example, the characterizing configuration and control of one arbitrary embodiment may be used in combination with that of other embodiments. Taking a concrete example, the pilot-injection-accompanying plug-assisted hydrogen-diffusive combustion of the sixth embodiment may be combined with the plural time ignition method of the seventh embodiment. In that case, ignition is conducted once subsequently to the pilot injection and in advance of the main injection. The ignition is also performed plural times while the main injection is in progress. This ensures that a high temperature atmosphere is developed within the combustion chamber as the pilot-injected fraction of hydrogen is combusted by the earliest ignition. Execution of the main injection under the high temperature atmosphere makes it possible to reliably ignite hydrogen with a reduced frequency of ignition operation and to thereby proportionately save the energy used in the ignition operation.

Although the ignition plug is utilized in the foregoing embodiments as the ignition device that ignites injected hydrogen stream for diffusive combustion, it may be contemplated that a glow plug is provided in addition to the ignition plug and ignition is executed by means of the glow plug. In other words, the glow plug may be used as the ignition device during the time of the diffusive combustion operation, while the ignition plug is employed as the ignition device in the conventional manner during the lean premix combustion operation.

Furthermore, although the invention is applied to a hydrogen engine in the foregoing embodiments, it would also be possible to apply the invention to gas-fueled internal combustion engines that make use of gaseous fuels other than hydrogen. In case of hydrogen, combustion occurs rapidly if an air excess ratio becomes greater than 2. However, the threshold value of the air excess ratio below which combustion becomes violent varies with the composition of gaseous fuel. Accordingly, in the case where the invention is applied to other gas-fueled internal combustion engines than a hydrogen engine, the threshold value may be defined based on the composition of particular gaseous fuel to be used. Then, a lean premix combustion operation may be selected in an operation region where the air excess ratio can be kept equal to or greater than the threshold value, while a diffusive combustion operation is selected in an operation region where it is impossible to keep the air excess ratio equal to or greater than the threshold value.

The invention claimed is:

1. A gas-fueled internal combustion engine operable with hydrogen gas as gaseous fuel, comprising:
an in-cylinder injection valve for injecting the gaseous fuel directly into a combustion chamber;
an ignition device arranged along the path of a stream of the gaseous fuel injected from the in-cylinder injection valve; and
a control unit for controlling operation timing of the ignition device and operation timing of the in-cylinder injection valve to thereby change combustion types of the gaseous fuel injected from the in-cylinder injection valve, between premix combustion and diffusive combustion, wherein: the control unit calculates the air excess ratio based on a hydrogen supply amount and an air intake amount, and the control unit selects, as an operation mode of the internal combustion engine, a lean premix combustion operation for premixing and combusting the gaseous fuel at a lean air-fuel ratio, when the internal combustion engine is operated in an operation region where the air excess ratio can be kept substantially equal to or greater than 2, and selects, as the operation mode of the internal combustion engine, a diffusive combustion operation for diffusion-combusting the gaseous fuel, when the internal combustion engine is operated in an operation region where the air excess ratio cannot be kept substantially equal to or greater than 2.

2. The gas-fueled internal combustion engine according to claim 1, further comprising a unit that acquires an in excess ratio,
wherein the control unit changes the operation mode of the internal combustion engine to the diffusive combustion operation when the air excess ratio is below a predetermined threshold value during the lean premix combustion operation.

3. The gas-fueled internal combustion engine according to claim 2, further comprising:
a unit that acquires an in-cylinder pressure-increase rate,
wherein the control unit changes the operation mode of the internal combustion engine to the diffusive combustion operation when the in-cylinder pressure-increase rate is above a predetermined threshold value during the lean premix combustion operation.

4. The gas-fueled internal combustion engine according to claim 1, wherein, during a time of executing the diffusive combustion operation, the control unit actuates the ignition device while gaseous fuel is being injected from the in-cylinder injection valve.

5. The gas-fueled internal combustion engine according to claim 1, wherein, during a time of executing the diffusive combustion operation, the control unit sets a duration of gaseous fuel injection to extend over a period from a time before a compression TDC to a time after the compression TDC and activates the ignition device substantially concurrently with the beginning of the gaseous fuel injection.

6. The gas-fueled internal combustion engine according to claim 1, wherein, during a time of executing the diffusive combustion operation, the control unit pilot-injects a fraction of the gaseous fuel, wherein an amount of the gaseous fuel that is pilot injected is decided by a required load, and performs a main injection for diffusive combustion in an atmosphere under which the pilot-injected gaseous fuel is mixed with air.

7. The gas-fueled internal combustion engine according to claim 6, wherein the control unit activates the ignition device subsequently to execution of the pilot injection and in advance of the main injection.

8. The gas-fueled internal combustion engine according to claim 6, wherein the control unit executes the pilot injection in a high load region of the operation region where the diffusive combustion operation is executed.

9. The gas-fueled internal combustion engine according to claim 1, wherein, when the diffusive combustion operation is executed, the control unit additionally activates the ignition device in the course of gaseous fuel injection depending on the gaseous fuel injection period.

10. The gas-fueled internal combustion engine according to claim 9, wherein the control unit increases an activation frequency of the ignition device step-by-step depending on the gaseous fuel injection period.

11. The gas-fueled internal combustion engine according to claim 1, wherein:
the ignition device is disposed at the apex of the combustion chamber; and
the in-cylinder injection valve is disposed on a side wall of the combustion chamber such that an injection hole of the in-cylinder injection valve is oriented to inject gaseous fuel toward the ignition device.

12. The gas-fueled internal combustion engine according to claim 1, wherein:
the ignition device and the in-cylinder injection valve are all disposed at the apex of the combustion chamber; and
an injection hole of the in-cylinder injection valve is oriented to ensure that the stream of gaseous fuel passes by the tip end of the ignition device.

13. The gas-fueled internal combustion engine according to claim 1, wherein:
a plurality of ignition devices is arranged along the path of the stream of the gaseous fuel injected from the in-cylinder injection valve; and
when the diffusive combustion operation is executed, the control unit activates the plurality of ignition devices either simultaneously or sequentially with a phase difference in order of distance, from closest to farthest, with respect to the in-cylinder injection valve.

14. The gas-fueled internal combustion engine according to claim 1, wherein the in-cylinder injection valve is configured to inject the gaseous fuel in a plurality of directions and each ignition device of the plurality of ignition devices is aligned with the respective injection directions of the in-cylinder injection valve.

15. The gas-fueled internal combustion engine according to claim 14, wherein the plurality of the ignition devices are arranged substantially at an equal distance from the tip end of the in-cylinder injection valve.

16. The gas-fueled internal combustion engine according to claim 14, wherein:
the in-cylinder injection valve is disposed at the center of the apex portion of the combustion chamber;
one of the ignition device is positioned immediately next to the in-cylinder injection valve in an offset relationship; and
a plurality of the ignition devices are arranged along an imaginary circle whose center coincides with the center axis of the in-cylinder injection valve.

17. The gas-fueled internal combustion engine according to claim 1, wherein the control unit allows the in-cylinder injection valve to inject the gaseous fuel prior to closure of an intake valve, in a low load region of the operation region where the lean premix combustion operation is executed, and allows the in-cylinder injection valve to inject the gaseous fuel immediately after the closure of the intake valve, in a high load region of the operation region where the lean premix combustion operation is executed.

18. The gas-fueled internal combustion engine according to claim 1, further comprising a port injection valve for injecting the gaseous fuel into an intake port,
wherein the control unit allows the port injection valve to inject the gaseous fuel prior to closure of an intake valve, in a low load region of the operation region where the lean premix combustion operation is executed, and allows the in-cylinder injection valve to inject the gaseous fuel immediately after closure of the intake valve, in a high load region of the operation region.

19. The gas-fueled internal combustion engine according to claim 1, wherein the control unit allows the in-cylinder injection valve to inject the gaseous fuel during the course of a compression stroke so that the gaseous fuel can be subject to stratified combustion, in an extremely low load region of the operation region where the lean premix combustion operation is executed, and allows the in-cylinder injection valve to inject the gaseous fuel during the course of an intake stroke or at the beginning of the compression stroke so that the gaseous fuel can be subject to homogeneous combustion, in the operation region above the extremely low load region.

20. A control method for a gas-fueled internal combustion engine operable with hydrogen gas as gaseous fuel, including an in-cylinder injection valve for injecting the gaseous fuel directly into a combustion chamber, and an ignition device arranged along the path of a stream of the gaseous fuel injected from the in-cylinder injection valve, comprising:
controlling operation timing of the ignition device and operation timing of the in-cylinder injection valve to thereby change combustion types of the gaseous fuel injected from the in-cylinder injection valve, between premix combustion and diffusive combustion; and
calculating an air excess ratio based on a hydrogen supply amount and an air intake amount,
wherein, as an operation mode of the internal combustion engine, a lean premix combustion operation for premixing and combusting the gaseous fuel at a lean air-fuel ratio is selected when the internal combustion engine is operated in an operation region where the air excess ratio an be kept substantially equal to or greater than 2, and a diffusive combustion operation for diffusion-combusting the gaseous fuel is selected when the internal combustion engine is operated in an operation region where the air excess ratio cannot be kept substantially equal to or greater than 2.

* * * * *